(12) United States Patent
Agapov et al.

(10) Patent No.: US 12,512,497 B2
(45) Date of Patent: Dec. 30, 2025

(54) INTEGRAL COMPOSITE MEMBRANE WITH A CONTINUOUS IONOMER PHASE

(71) Applicants: W. L. Gore & Associates, Inc., Newark, DE (US); W. L. Gore & Associates G.K., Tokyo (JP)

(72) Inventors: Alexander Agapov, Newark, DE (US); Takeyuki Suzuki, Tokyo (JP)

(73) Assignees: W. L. Gore & Associates, Inc.; W. L. Gore & Associates G.K., Tokyo (JP)

( * ) Notice: Subject to any disclaimer, the term of this patent is extended or adjusted under 35 U.S.C. 154(b) by 0 days.

(21) Appl. No.: 18/206,834

(22) Filed: Jun. 7, 2023

(65) Prior Publication Data
US 2023/0420718 A1    Dec. 28, 2023

Related U.S. Application Data

(63) Continuation of application No. 17/262,516, filed as application No. PCT/US2018/044104 on Jul. 27, 2018, now Pat. No. 11,715,839.

(51) Int. Cl.
*H01M 8/1044* (2016.01)
*C25B 1/04* (2021.01)
(Continued)

(52) U.S. Cl.
CPC ............. *H01M 8/1044* (2013.01); *C25B 1/04* (2013.01); *C25B 13/02* (2013.01); *C25B 13/08* (2013.01);
(Continued)

(58) Field of Classification Search
CPC .. H01M 5/489; H01M 50/483; H01M 50/491; H01M 8/1044; H01M 8/0239;
(Continued)

(56) References Cited

U.S. PATENT DOCUMENTS

| | | | |
|---|---|---|---|
| 4,775,742 | A | 10/1988 | Fitzpatrick |
| 5,304,430 | A | 4/1994 | Ludwig |

(Continued)

FOREIGN PATENT DOCUMENTS

| | | |
|---|---|---|
| CN | 1217004 A | 5/1999 |
| CN | 101350418 A | 9/2010 |

(Continued)

OTHER PUBLICATIONS

International Search Report and Written Opinion from International Application No. PCTUS2018/044104 dated Apr. 8, 2019.

*Primary Examiner* — Karie O'neill Apicella
(74) *Attorney, Agent, or Firm* — Faegre Drinker Biddle & Reath

(57) ABSTRACT

Embodiments are directed to composite membranes having a microporous polymer structure, and an ion exchange material forming a continuous ionomer phase within the composite membrane. The continuous ionomer phase refers to absence of any internal interfaces in a layer of ionomer or between any number of layers coatings of the ion exchange material provided on top of one another. The composite membrane exhibits a haze change of 0% or less after being subjected to a blister test procedure. No bubbles or blisters are formed on the composite membrane after the blister test procedure. A haze value of the composite membrane is between 5% and 95%, between 10% and 90% or between 20% and 85%. The composite membrane may have a thickness of more than 17 microns at 0% relative humidity.

14 Claims, 11 Drawing Sheets

(51) Int. Cl.

| | |
|---|---|
| *C25B 13/02* | (2006.01) |
| *C25B 13/08* | (2006.01) |
| *H01M 8/0239* | (2016.01) |
| *H01M 8/0243* | (2016.01) |
| *H01M 8/0245* | (2016.01) |
| *H01M 8/10* | (2016.01) |
| *H01M 8/1009* | (2016.01) |
| *H01M 8/1053* | (2016.01) |
| *H01M 8/1062* | (2016.01) |
| *H01M 8/18* | (2006.01) |
| *H01M 50/403* | (2021.01) |
| *H01M 50/489* | (2021.01) |
| *H01M 50/491* | (2021.01) |

(52) U.S. Cl.
CPC ....... *H01M 8/0239* (2013.01); *H01M 8/0243* (2013.01); *H01M 8/0245* (2013.01); *H01M 8/1009* (2013.01); *H01M 8/1053* (2013.01); *H01M 8/1062* (2013.01); *H01M 8/188* (2013.01); *H01M 50/403* (2021.01); *H01M 50/489* (2021.01); *H01M 50/491* (2021.01); *H01M 2008/1095* (2013.01)

(58) Field of Classification Search
CPC ............. H01M 8/0243; H01M 8/1009; H01M 8/1053; H01M 8/1062; H01M 8/188; C25B 1/04; C25B 13/02; C25B 13/08
See application file for complete search history.

(56) References Cited

U.S. PATENT DOCUMENTS

| | | | |
|---|---|---|---|
| 6,130,175 | A | 10/2000 | Rusch et al. |
| 6,613,203 | B1 | 9/2003 | Hobson et al. |
| 11,715,839 | B2 | 8/2023 | Agapov et al. |
| 2004/0067402 | A1 | 4/2004 | Bahar et al. |
| 2005/0014056 | A1 | 1/2005 | Zuber et al. |
| 2006/0051568 | A1 | 3/2006 | O'Brien |
| 2007/0087245 | A1 | 4/2007 | Fuller et al. |
| 2014/0120431 | A1 | 5/2014 | Roelofs et al. |
| 2014/0370404 | A1* | 12/2014 | Kato .................. H01M 8/1058 429/418 |
| 2021/0296674 | A1 | 9/2021 | Agapov et al. |

FOREIGN PATENT DOCUMENTS

| | | | | |
|---|---|---|---|---|
| EP | 2800194 | A1 | 11/2014 | |
| JP | 2005-103853 | A | 4/2005 | |
| JP | 2004-119202 | A | 10/2005 | |
| JP | 2006-202532 | A | 8/2006 | |
| JP | 2007-109657 | A | 4/2007 | |
| JP | 2008512551 | A * | 4/2008 | .......... B01D 69/107 |
| JP | 2010170782 | A | 8/2010 | |
| JP | 2012-180529 | A | 9/2012 | |
| JP | 2015-076201 | A | 4/2015 | |
| JP | 2015-128060 | | 1/2016 | |
| WO | 03/22912 | A2 | 3/2003 | |
| WO | 2006/031456 | A1 | 3/2006 | |
| WO | 2007/067385 | A1 | 6/2007 | |
| WO | 2012/174463 | A1 | 12/2012 | |
| WO | 2014/099874 | A1 | 6/2014 | |
| WO | 2018/047925 | A1 | 3/2018 | |

* cited by examiner

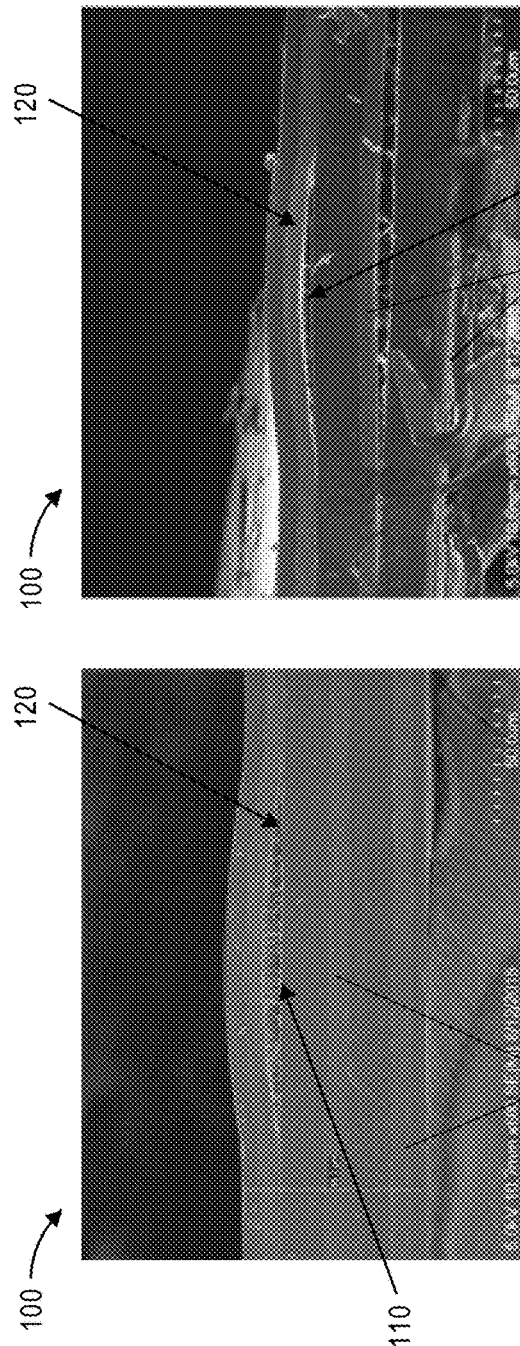
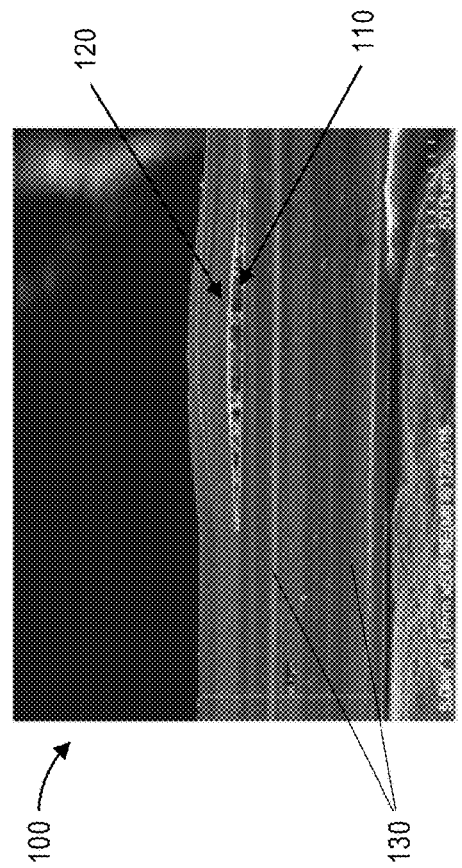
FIG. 1A
FIG. 1B
FIG. 1C

INTEGRAL COMPOSITE MEMBRANE WITH A CONTINUOUS IONOMER PHASE

CROSS-REFERENCE TO RELATED APPLICATION

This application is a continuation of U.S. application Ser. No. 17/262,516, filed Jan. 22, 2021, which is a national phase application of PCT Application No. PCT/US2018/044104, internationally filed on Jul. 27, 2018, which are herein incorporated by reference in their entireties for all purposes.

FIELD OF THE INVENTION

The present invention relates to an integral composite membrane, and in particular, to a composite membrane having a continuous ionomer phase.

BACKGROUND OF THE INVENTION

Composite membranes such as anion, cation, and ampho-teric composite membranes are used in a variety of applications. For example, composite membranes are components of polymer electrolyte fuel cells where the composite membranes are located between a cathode and anode, and transport protons formed near a catalyst at a hydrogen electrode to an oxygen electrode thereby allowing a current to be drawn from the polymer electrolyte fuel cells. These polymer electrolyte fuel cells are particularly advantageous because they operate at lower temperatures than other fuel cells. Also, these polymer electrolyte fuel cells do not contain any corrosive acids which are found in phosphoric acid fuel cells.

A composite membrane may also be used for electro-chemical devices to separate liquids contained within the electrochemical device such as electrolysis cell or flow battery, such as redox flow battery. The flow battery is charged and discharged by a reversible reduction-oxidation reaction between the two liquid electrolytes of the battery. Ion exchange (i.e., providing flow of electric current) occurs through the composite membrane while the two liquid electrolytes circulate in their own respective space within the flow battery. The flow battery is a scalable system which can be operated in a wide range of conditions. For example, the flow battery can be integrated into smart-grids, and is advantageous in connection with storing energy from wind or solar farms. The flow battery is further characterized by high longevity in the range of several years, easy maintenance, and overall energy efficiency.

Composite membranes incorporated into fuel cells as well as those employed in, redox flow battery, chlor-alkali electrolysis cells, water electrolysis, diffusion dialysis, electro-dialysis, pervaporation, and vapor permeation applications typically comprise ionomer films having a discontinuous ionomer phase constructed from multiple coatings of an ionomer. However, these ionomer film composite membranes can suffer from premature structural failure in a flow battery application. The primary mode of failure for these ionomer film composite membranes during operation of the flow battery is the formation of bubbles or blisters inside of the membrane in a layer of ionomer or between the multiple coatings of the ionomer. Accordingly, the need exists for improved composite membranes that have a continuous ionomer phase, high ion conductance, low crossover of reactive species, high mechanical strength, and low in-plane swelling.

SUMMARY OF THE INVENTION

In one embodiment, the invention relates to a composite membrane for a redox flow battery. The composite membrane includes a microporous polymer structure, and an ion exchange material at least partially embedded within the microporous polymer structure and rendering at least a portion of the microporous polymer structure occlusive. The ion exchange material forms a continuous ionomer phase within the composite membrane. The composite membrane exhibits a haze change of 0% or less after being subjected to a blister test procedure. The blister test procedure may include at step one immersing the composite membrane for 3 minutes in an 6 mol/L aqueous sulfuric acid solution at 80° C.; at step two, removing the composite membrane from the aqueous sulfuric acid solution; at step three, immersing the composite membrane for one minute in deionized water at ambient conditions; at step four removing the composite membrane from the deionized water; repeating cycle composed of steps one through four consecutively for at least two times; at step five, drying the composite membrane at ambient conditions; and at step six, counting bubbles or blisters formed on the composite membrane. According to various embodiments, no bubbles or blisters are formed on the composite membrane after the blister test procedure (i.e. zero bubbles or blisters are counted on the composite membrane). In some embodiments, a haze value of the composite membrane is between 5% and 95%, between 10% and 90% or between 20% and 85%.

In some embodiments, the composite membrane includes a single coating of the ion exchange material. The composite membrane may have a thickness of 7 to 100 microns at 0% relative humidity, 17 to 50 microns at 0% relative humidity or 25 to 40 microns at 0% relative humidity. The composite membrane according to various embodiments may have a thickness of more than 17 microns at 0% relative humidity.

In some embodiments, the composite membrane includes multiple coatings of the ion exchange material. In such embodiments, a first coating of the ion exchange material is formed on a second coating of the ion exchange material without subjecting the second coating to a drying step. The composite membrane may have a thickness of to 150 microns at 0% relative humidity, 15 to 80 microns at 0% relative humidity, or to 60 microns at 0% relative humidity.

According to various embodiments, the ion exchange material may have equivalent weight between 500 and 2000 g/mole eq., between 700 and 1500 g/mole eq., or between 900 and 1200 g/mole eq, or between 810 and 1100 g/mole eq.

According to various embodiments, the composite membrane further comprises an additional layer of ion exchange material provided at a bottom surface of the composite membrane. In some embodiments, the microporous polymer structure comprises at least two microporous polymer layers. In some embodiments, the composite membrane comprises more than one ion exchange material in the form of a mixture of ion exchange materials. Yet in other embodiments, the composite membrane comprises more than one layer of ion exchange material, such that the layers of ion exchange material are formed of the same ion exchange material or different ion exchange materials.

In another embodiment, the invention relates to a composite membrane for a redox flow battery. The composite membrane includes a microporous polymer structure and ion exchange material at least partially embedded within the microporous polymer structure and rendering at least a portion of the microporous polymer structure occlusive. The ion exchange material forms a continuous ionomer phase within the composite membrane. The composite membrane has a thickness of more than 17 microns at 0% relative humidity. For example, the composite membrane may have a thickness of 7 to 100 microns at 0% relative humidity, 17 to 50 microns at 0% relative humidity or 25 to 40 microns at 0% relative humidity.

In another embodiment, the invention relates to a composite membrane for a redox flow battery. The composite membrane includes a microporous polymer structure and ion exchange material at least partially embedded within the microporous polymer structure and rendering at least a portion of the microporous polymer structure occlusive. The ion exchange material forms a continuous ionomer phase within the composite membrane. The composite membrane has a thickness of more than 17 microns at 0% relative humidity. For example, the composite membrane may have a thickness of 7 to 100 microns at 0% relative humidity, 17 to 50 microns at 0% relative humidity or 25 to 40 microns at 0% relative humidity. The composite membrane exhibits a haze change of 0% or less after being subjected to a blister test procedure. That is, a haze value of the composite membrane remains the same or reduces from before to after being subjected to the blister test procedure. According to various embodiments, a haze value of the composite membrane is between 5% and 95%, between 10% and 90% or between 20% and 85%.

In another embodiment, a method of forming the above described composite membrane(s) is provided. The method comprises providing a support layer, and applying an ion exchange material to the support layer in one step. The method further includes obtaining a microporous polymer structure comprising at least one microporous polymer layer. The method further includes laminating the at least one microporous polymer layer to the ion exchange material to form an impregnated microporous polymer structure having a continuous ionomer phase. The impregnated microporous polymer structure is then dried and thermally annealed to form the composite membrane.

In other embodiments, a flow battery comprising the above described composite mem brane(s) is provided. The flow battery may include a cathode reservoir including a positive electrolyte fluid, an anode reservoir including a negative electrolyte fluid, and an exchange region including the above-described composite membrane positioned between first side having a positive electrode and second side having a negative electrode. The cathode reservoir is connected via a first pump to the first side of the exchange region, and the anode reservoir is connected via a second pump to the second side of the exchange region.

In other embodiments, a composite membrane is provided, where the composite membrane is prepared by a process comprising obtaining an untreated microporous polymer structure, applying an impregnant solution comprising an ion exchange material to the untreated microporous polymer structure to form a treated microporous polymer structure having a continuous ionomer phase; and drying and thermally annealing the treated microporous polymer structure to form the composite membrane, wherein the ion exchange material forms a continuous ionomer phase within the composite membrane, wherein the composite membrane exhibits a haze change of 0% or less after being subjected to a blister test procedure.

Other aspects and variants of the invention will become evident in the ensuing discussion.

BRIEF DESCRIPTION OF THE DRAWINGS

The present invention will be better understood in view of the following non-limiting figures, in which:

FIGS. 1A-1C show photomicrographs of a cross-section of a composite membrane comprising bubbles or blisters;

DETAILED DESCRIPTION OF THE INVENTION

I. Introduction

In one embodiment, the present invention is directed to a composite membrane comprising a porous substrate with an impregnant comprising an ion exchange material (e.g., an ionomer film composite membrane). One problem associated with traditional ionomer film composite membranes, however, is their reduced ability to maintain structural integrity, particularly when employed in flow batteries. For example, it has been discovered that bubbles or blisters may form in the ionomer film composite membranes inside of the membrane at weak internal interfaces in a layer of ionomer or between multiple coatings of the ionomer that originate from traditional multiple pass coating processes employed for the production of the ionomer film composite membranes. FIGS. 1A-1C show photomicrographs of traditional ionomer film composite membranes 100 having bubbles or blisters 110 in weak internal interfaces 120 between multiple coatings 130 of the ionomer.

Figure 2A:
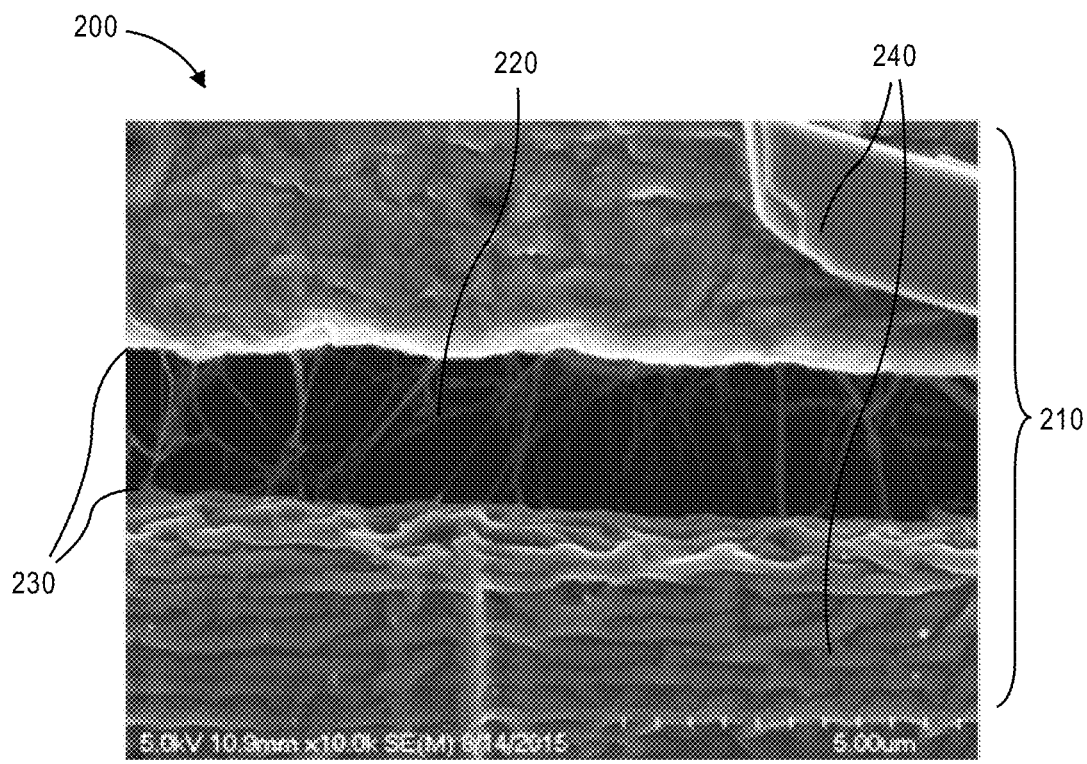
FIGS. 2A and 2B show photomicrographs of a cross-section of a composite membrane having a discontinuous ionomer phase comprising bubbles or blisters within an interface between two ionomers.
Figure 2B:
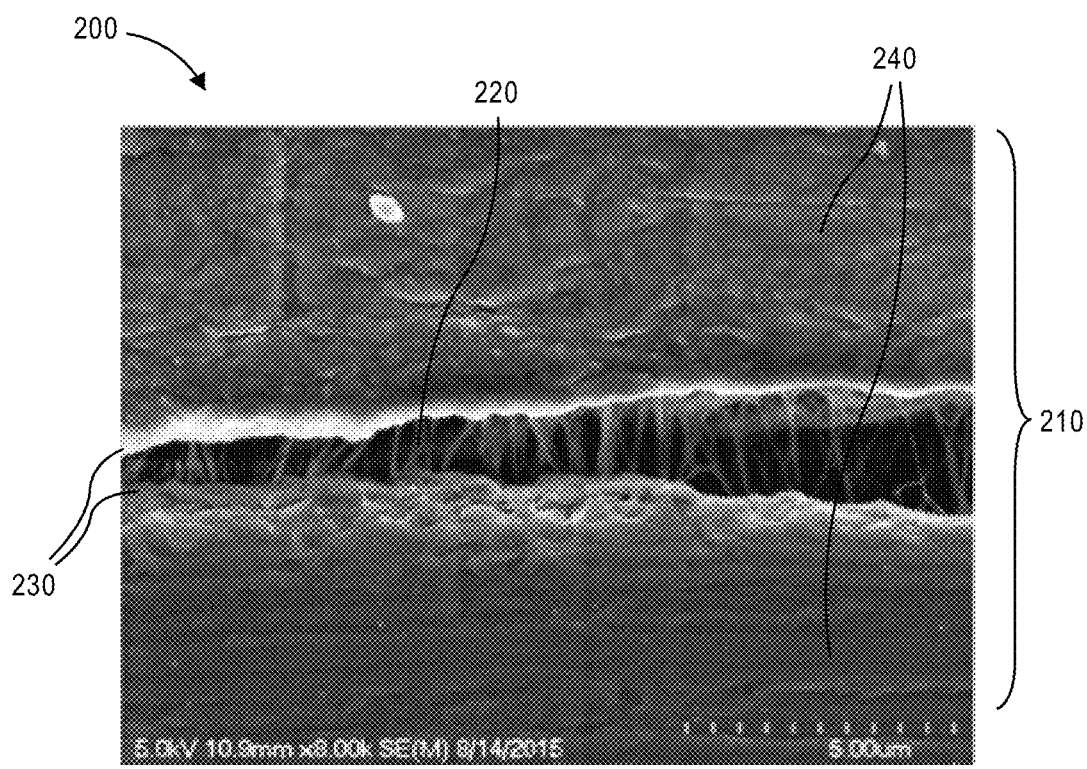

A traditional multiple pass coating process for creating an ionomer film composite membrane comprises a first pass ionomer coating, which includes contacting a porous substrate such as expanded polytetrafluoroethylene (ePTFE) with an impregnant such as perfluorosulfonic acid polymers to form a first pass ionomer. The first pass ionomer is then heated in an oven to dry and thermally anneal the porous substrate with the impregnant. Subsequently, a second pass ionomer coating is applied to the already dried first pass ionomer, contacted with a porous substrate to create a second pass ionomer, and the second pass ionomer is dried. Optionally, additional pass ionomer coatings can be applied on top of one another, contacted with porous substrates, and dried and annealed. The resulting structure is characterized by a discontinuous ionomer phase having an internal interface between each of the ionomers, e.g., between the first pass ionomer and the second pass ionomer. FIGS. 2A-2B show photomicrographs of traditional ionomer film composite membranes 200 having a discontinuous ionomer phase 210 with bubbles or blisters 220 formed at an internal interface 230 between each of the ionomers 240. Fibril-like structures 250 are observed within the bubbles or blisters 220.

Without being bound by theory, the liquid electrolytes used in a flow battery may be attracted to the internal interface in a layer of ionomer or between each of the ionomers, which may lead to the presence of an osmotic pressure gradient inside of the composite membrane during operation of the flow battery. The osmotic pressure gradient acts as a driving force for drawing water into the internal interface during operation of the flow battery. A hydraulic expansive force associated with the water being drawn into the internal interface leads to the formation of the bubbles or blisters between each of the ionomers.

To address these problems, in one embodiment, the present invention is further directed to composite membranes having a continuous ionomer phase. As used herein, "continuous ionomer phase" means any number of layers or coatings of ionomer substrate and/or ion exchange material provided on top of one another that do not have any internal interfaces in a layer of ionomer or between the layers or coatings. Integral interfaces may be caused, for example, by drying and thermally annealing of the porous substrate and/or ion exchange material prior to application of a subsequent layer or coating. In some embodiments, a single pass ionomer coating process is performed, as described herein, to create a single pass ionomer composite membrane having a continuous ionomer phase. The composite membrane made with single pass ionomer coating optionally has a thickness in the range of 7 to 100 microns at 0% relative humidity (RH), 17 to 50 microns at 0% RH, or 25 to 40 microns at 0% RH and optionally comprises between 3 $g/m^2$ and 80 $g/m^2$ of porous substrate, or 5 $g/m^2$ and 50 $g/m^2$ of porous substrate, or 10 $g/m^2$ and 30 $g/m^2$ of porous substrate. In alternative embodiments, a multiple pass ionomer coating process is performed without a drying step between each pass of coating, as described herein, to create a multiple pass ionomer composite membrane having a continuous ionomer phase. The multiple pass ionomer composite membrane optionally has a thickness in the range of 10 to 150 microns at 0% RH, 15 to 80 microns at 0% RH, or 20 to 60 microns at 0% RH and optionally comprises between 3 $g/m^2$ and 80 $g/m^2$ of porous substrate, or 5 $g/m^2$ and 50 $g/m^2$ of porous substrate, or 10 $g/m^2$ and 30 $g/m^2$ of porous substrate. In some embodiments, an ion exchange material of specific equivalent weight is used for ionomer coating process, as described herein, to create a composite membrane having a continuous ionomer phase. The ion exchange material optionally has equivalent weight between 500 and 2000 g/mole eq., or between 700 and 1500 g/mole eq., or between 700 and 1200 g/mole eq, or between 810 and 1100 g/mole eq. In some embodiments, a single or multiple pass ionomer coating process is performed without a drying step between each pass of coating, as described herein, to create a composite membrane having a continuous ionomer phase with pre-determined haze. The haze of composite membrane optionally is between 5% and 95%, or 10% and 90%, or 20% and 85%. The composite membrane optionally exhibits a reduction or no change in its haze value after such membrane is subjected to the blister test procedure. Accordingly, the present invention, in one embodiment, is directed to composite membranes having a continuous ionomer phase that does not have internal interfaces in a layer of ionomer or between multiple coatings of the ionomer, and exhibits desirable high ion conductance, low crossover of reactive species, high mechanical strength, and low in-plane swelling characteristics.

Various definitions used in the present disclosure are provided below.

As used herein, the terms "ionomer" and "ion exchange material" refer to a cation exchange material, an anion exchange material, or an ion exchange material containing both cation and anion exchange capabilities. Mixtures of ion exchange materials may also be employed. Ion exchange material may be perfluorinated or hydrocarbon-based. Suitable ion exchange materials include, for example, perfluorosulfonic acid polymers, perfluorocarboxylic acid polymers, perfluorophosphonic acid polymers, styrenic ion exchange polymers, fluorostyrenic ion exchange polymers, polyarylether ketone ion exchange polymers, polysulfone ion exchange polymers, bis(fluoroalkylsulfonyl)imides, (fluoroalkylsulfonyl)(fluorosulfonyl)imides, polyvinyl alcohol, polyethylene oxides, divinyl benzene, metal salts with or without a polymer, and mixtures thereof. In exemplary embodiments, the ion exchange material comprises perfluorosulfonic acid (PFSA) polymers made by copolymerization of tetrafluoroethylene and perfluorosulfonyl vinyl ester with conversion into proton form. Of course, the suitability of a particular ion exchange material depends to a certain extent on the application for which the composite membrane is intended. Examples of suitable perfluorosulfonic acid polymers for use in fuel cell or flow battery applications include Nafion® (E.I. DuPont de Nemours, Inc., Wilmington, Del., US), Flemion® (Asahi Glass Co. Ltd., Tokyo, JP), and Aciplex® (Asahi Chemical Co. Ltd., Tokyo, JP), which are commercially available perfluorosulfonic acid copolymers. Other examples of suitable perfluorosulfonic acid polymers for use in fuel cell applications include perfluorinated sulfonyl (co)polymers such as those described in U.S. Pat. No. 5,463,005.

As used herein "continuous ionomer phase" refers to an ionomer with no internal interface. A continuous ionomer phase may refer, but is not limited, to a composite membrane made with single pass ionomer coating. A composite membrane made with single pass ionomer coating may contain one or more layers of material that are formed on top of each other (e.g. coating of a imbibed layer (e.g. an ionomer layer impregnated in the microporous polymer structure) formed on a backer layer, laminated with a microporous polymer layer) and dried and thermally annealed (e.g. cured)).

As used herein, the term "microporous polymer structure" refers to a polymeric matrix that supports the ion exchange material, adding structural integrity and durability to the resulting composite membrane. In exemplary embodiments, the microporous polymer structure comprises expanded polytetrafluoroethylene having a node and fibril structure. The microporous structure described herein has pores that are not visible to the naked eye. According to various optional embodiments, the pores may have an average pore size from 0.01 to 100 microns, e.g., from 0.05 to 10 microns or from 0.1 to 1 microns.

In some embodiments the microporous polymer structure is expanded polytetrafluoroethylene having an average pore size from 0.01 to 100 microns, e.g., from 0.05 to 10 microns or from 0.1 to 1 microns.

As used herein, an interior volume of a microporous polymer structure is referred to as "substantially occluded" when said interior volume has structures that is characterized by low volume of voids, less than 10% by volume, and being highly impermeable to gases, Gurley numbers larger than 10000 s. Conversely, interior volume of microporous polymer structure is referred to as "non-occluded" when said interior volume has structures that is characterized by large volume of voids, more than 10% by volume, and being permeable to gases, Gurley numbers less than 10000 s.

In some embodiments the microporous polymer structure is expanded polytetrafluoroethylene having an average pore size from 0.01 to 100 microns, e.g., from 0.05 to 10 microns or from 0.1 to 1 microns, and voids less than 10% by volume.

A suitable microporous polymer structure depends largely on the application in which the composite membrane is to be used. The microporous polymer structure preferably has good mechanical properties, is chemically and thermally stable in the environment in which the composite membrane is to be used, and is tolerant of any additives used with the ion exchange material for impregnation. A suitable microporous polymer structure for redox flow battery or fuel cell applications may include porous polymeric materials. The porous polymeric materials may include fluoropolymers, chlorinated polymers, hydrocarbons, polyamides, polycarbonates, polyacrylates, polysulfones, copolyether esters, polyvinylidene fluoride, polyaryl ether ketones, polybenzimidazoles, poly(ethylene-co-tetrafluoroethylene), poly(tetrafluoroethylene-co-hexafluoropropylene). In some embodiments, the microporous polymer structure includes a perfluorinated porous polymeric material. The perfluorinated porous polymeric material may include polytetrafluoroethylene (PTFE), expanded polytetrafluoroethylene (ePTFE), polyvinylidene fluoride (PVDF), expanded polyvinylidene fluoride (ePVDF), expanded poly(ethylene-co-tetrafluoroethylene) (eEPTFE) or mixtures thereof. In some embodiments, the microporous polymer structure includes a hydrocarbon material. The hydrocarbon material may include polyethylene, expanded polyethylene, polypropylene, expanded polypropylene, polystyrene, or mixtures thereof. Examples of suitable perfluorinated porous polymeric materials for use in redox flow battery or fuel cell applications include ePTFE made in accordance with the teachings of U.S. Pat. No. 8,757,395, which is incorporated herein by reference in its entirety, and commercially available in a variety of forms from W. L. Gore & Associates, Inc., of Elkton, MD.

II. Composite Membranes

Composite membranes, having either a continuous ionomer phase or a discontinuous ionomer phase, have a predetermined haze. Haze refers to the wide-angle scattering of light by the composite membrane resulting in loss of optical contrast with which an object can be seen when viewed through the composite membrane. Haze can be measured with a haze meter or transparency meter as described herein in detail. The composite membranes with continuous ionomer phase do not blister. Accordingly, the haze of composite membranes with continuous ionomer phase does not change after the blister test or continuous operation in flow battery. On the other hand, composite membranes with discontinuous ionomer phase (i.e. composite membranes without continuous ionomer phase) do blister. Accordingly, the haze of composite membranes with discontinuous ionomer phase changes after the blister test or continuous operation in flow battery. The haze in composite membranes with continuous ionomer phase is similar to the haze in composite membranes without continuous ionomer phase before the blister test. However, the haze in composite membranes with continuous ionomer phase is different from the haze in composite membranes without continuous ionomer phase after the blister test.

Composite membranes, having either a continuous ionomer phase or a discontinuous ionomer phase, also have a predetermined bubble or blister density that can be measured after the membrane is used continuously in a flow battery for a predetermined amount of time or exposed to a blister test procedure as described in detail herein. The area of the bubbles or blisters is measured as a ratio of the area of the composite membrane to the area of the bubbles or blisters in the composite membrane.

In some embodiments, the predetermined bubble or blister density of a composite membrane with continuous ionomer phase formed via a single pass ionomer coating and after continuous use in a flow battery for 10 days is less than 0.3%, less than 0.2%, or less than 0.1, or 0%. In alternative embodiments, the bubble or blister area of a continuous ionomer phase formed via multiple passes of ionomer coating without a drying step between each pass of coating and after continuous use in a flow battery for 10 days is less than 0.3%, less than 0.2%, or less than 0.1% or 0%. In other embodiments, the bubble or blister area of a composite membrane with continuous ionomer phase formed via a single pass ionomer coating and after exposure to a blister test procedure is less than 0.3%, less than 0.2%, or less than 0.1%, or 0. In alternative embodiments, the bubble or blister area of a continuous ionomer phase formed via multiple passes of ionomer coating without a drying step between each pass of coating and after exposure to a blister test procedure is less than 0.3%, less than 0.2%, or less than 0.1%, or 0%. In some embodiments, the change in haze of a composite membrane with continuous ionomer phase formed via a single pass ionomer coating and after exposure to the blister test procedure is 0% or less, between 0% and −60%, or between 0% and −45%, or between 0% and −30%, or between 0% and −21%. In alternative embodiments, the change in haze of a composite membrane with continuous ionomer phase formed via multiple passes of ionomer coating without a drying step between each pass of coating and after exposure to a blister test is 0% or less, between 0% and −60%, or between 0% and −45%, or between 0% and −30%, or between 0% and −21%.

a. Composite Membranes Having A Continuous Ionomer Phase

Figure 3A:
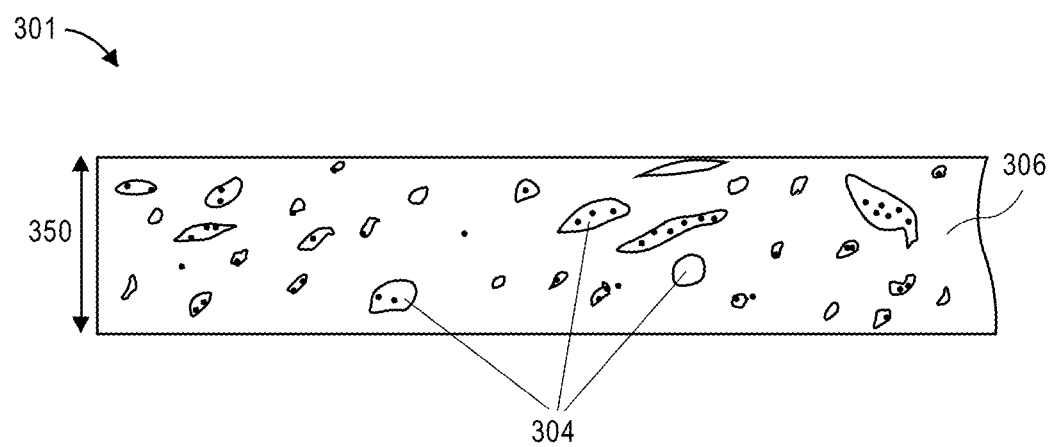
FIG. 3A shows a cross sectional side view of a composite membrane in accordance with some aspects of the invention.

As discussed above, the composite membrane according to various embodiments have a continuous ionomer phase. As shown in FIG. 3A, a composite membrane 301 is provided that includes a microporous substrate 306 and an impregnant comprising an ion exchange material or ion exchange resin 304 that is characterized by a continuous ionomer phase 350 (i.e., absence of interfaces between ionomer coatings). The porous substrate 306 is a membrane defined by a thickness of less than 0.4 mm (400 microns). The ion exchange resin 304 substantially impregnates the porous substrate 306 so as to render the interior volume substantially occlusive. For example, by filling greater than 90% of the interior volume of the porous substrate 306 with the ion exchange resin 304 substantial occlusion will occur.

The composite membrane of the present disclosure may be employed in various applications. In some embodiments, the composite membrane of the present disclosure may be employed in polarity-based chemical separations, pervaporation, gas separation, dialysis separation, industrial electrochemistry such as chlor-alkali electrolysis and other electrochemical applications, use as a super acid catalyst, or use as a medium in enzyme immobilization. In preferred embodiments, the composite membrane of the present disclosure may be used in electrochemical applications to separate liquids contained within an electrochemical device. In a preferred embodiment, the composite membrane of the present disclosure may be employed in fuel cells. In another preferred embodiment, the composite membrane of the present disclosure may be employed in water electrolysis cells, water electrolyzers. In yet another preferred embodiment, the composite membrane of the present disclosure may be employed in flow batteries, such as redox flow batteries.

The impregnant comprises the ion exchange material or ion exchange resin 304. The ion exchange material or ion exchange resin 304 is a cation exchange material, an anion exchange material, or an ion exchange material containing both cation and anion exchange capabilities. Mixtures of ion exchange materials may also be employed as impregnates.

Optionally, the impregnant solution further includes a surfactant. The surfactant may be employed with the ion exchange material to ensure impregnation of the interior volume of the porous substrate. Surfactants or surface active agents having a hydrophobic portion and a hydrophilic portion may be utilized. Preferable surfactants are those having a molecular weight of greater than 100 and may be classified as anionic, nonionic, or amphoteric which may be hydrocarbon or fluorocarbon-based and include for example, Merpol®, a hydrocarbon based surfactant or Zonyl®, a fluorocarbon based surfactant, both commercially available from E. I. DuPont de Nemours, Inc. of Wilmington, DE.

In various embodiments, the surfactant is a nonionic material, octylphenoxy polyethoxyethanol having a chemical structure:

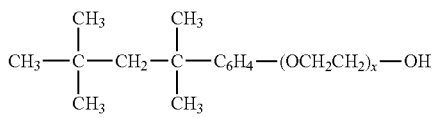

where x=10 (average) known as Triton X-100, commercially available from Rohm & Haas of Philadelphia, Pa.

The impregnant may further comprise other components, if desired. For example, the impregnant may comprise an electrocatalyst composition. Suitable catalyst compositions include unsupported and supported catalysts comprising precious metals, transition metals, oxides thereof, alloys thereof, and mixtures thereof. The presence of electrocatalyst in the ion exchange layer of the composite membrane may be desirable for reducing reactant crossover, such as, for example, methanol in direct methanol fuel cell applications. Further, the electrocatalyst may provide for more effective ionomer-electrocatalyst interactions, thereby facilitating the oxidation and reduction of reactant gases.

The impregnant may further comprise electrochemically inert materials that promote water retention in the composite membrane under normal operating conditions. Polymeric, non-polymeric or hydrogel materials may be suitable. For example, the impregnant may further comprise particulate silica and/or fibrous silica, as described in U.S. Pat. No. 5,523,181, which is incorporated herein by reference, or a hydrogel comprising silicon oxides, such as described in Chemistry of Materials, Vol. 7, pp. 2259-2268 (1995). Other suitable such materials will be apparent to persons skilled in the art.

The impregnant may further comprise compatible mixtures of non-ionic polymers, such as polyarylether ketones or polysulfones, for example. Having non-ionic polymers in the impregnant may be advantageous in some applications. For example, non-ionic polymers in the impregnant may reduce the amount of methanol cross-over in direct methanol fuel cells.

In embodiments, in which a polymeric composition is used, the impregnant is typically introduced into the porous substrate via an impregnation solution comprising the impregnant in a suitable solvent. The choice of solvent will depend, in part, on both the composition of the impregnant and the composition of the porous substrate. Suitable solvents include, for example, water, ethanol, propanol, butanol, methanol, ketones, carbonates, tetrahydrofuran, acetonitrile N,N-dimethylformamide, N-methylpyrrolidone, dimethylsulfoxide, N,N-dimethylacetamide, and mixtures thereof. As used herein, "solvent" means any suitable solvent or mixture of solvents.

Alternatively, the ion exchange material may comprise one or more monomers or oligomers that may be impregnated into the porous substrate and subsequently polymerized or otherwise chemically linked. Thus, as used herein, "impregnant solution" includes ion exchange monomers, oligomers, polymers, and/or mixtures thereof in solvent, as well as neat ion exchange material monomers and/or oligomers. Note that where the impregnation solution comprises components in addition to the ion exchange material, such components need not be dissolved in the liquid phase. Thus, impregnation solutions may also be dispersions.

In one embodiment, a composite membrane for a redox flow battery may include an expanded polytetrafluoroethylene having an average pore size from 0.01 to 100 microns; and a perfluoro sulfonic acid resin with EW of 810 to 1100 g/(mole acid equivalence) at least partially embedded within the microporous polymer structure and rendering at least a portion of the microporous polymer structure occlusive. The perfluoro sulfonic acid resin forms a continuous ionomer phase within the composite membrane. The composite membrane exhibits a haze change of 0% or less after being subjected to a blister test procedure.

b. Processes for Preparing the Composite Membranes

Figure 3B:
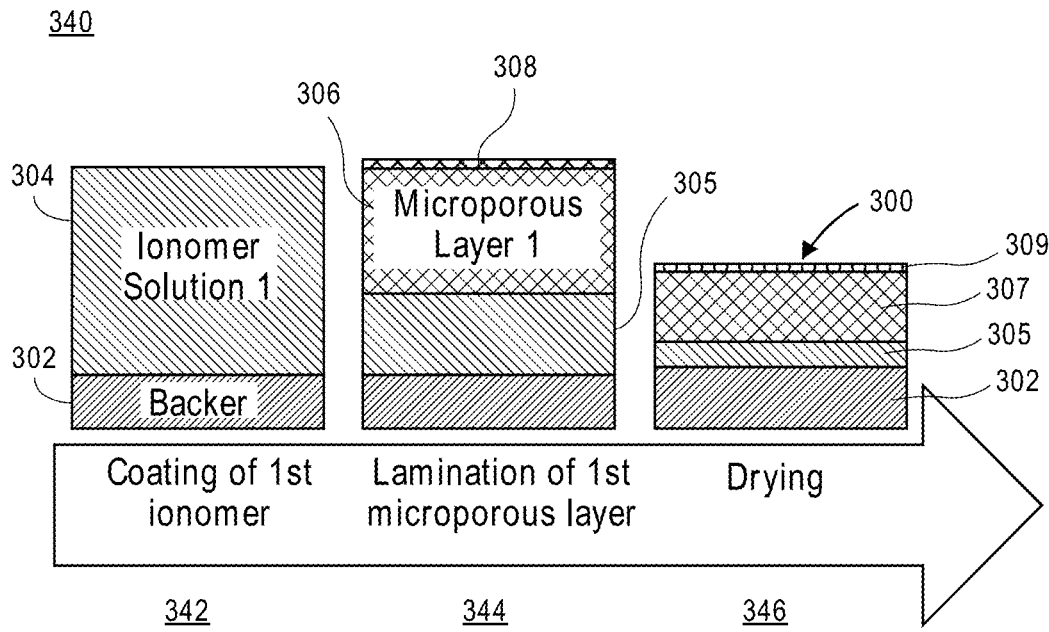
FIGS. 3B-3D show exemplary flow diagrams of processes for constructing exemplary composite membranes in accordance with some aspects of the invention.
Figure 3C:
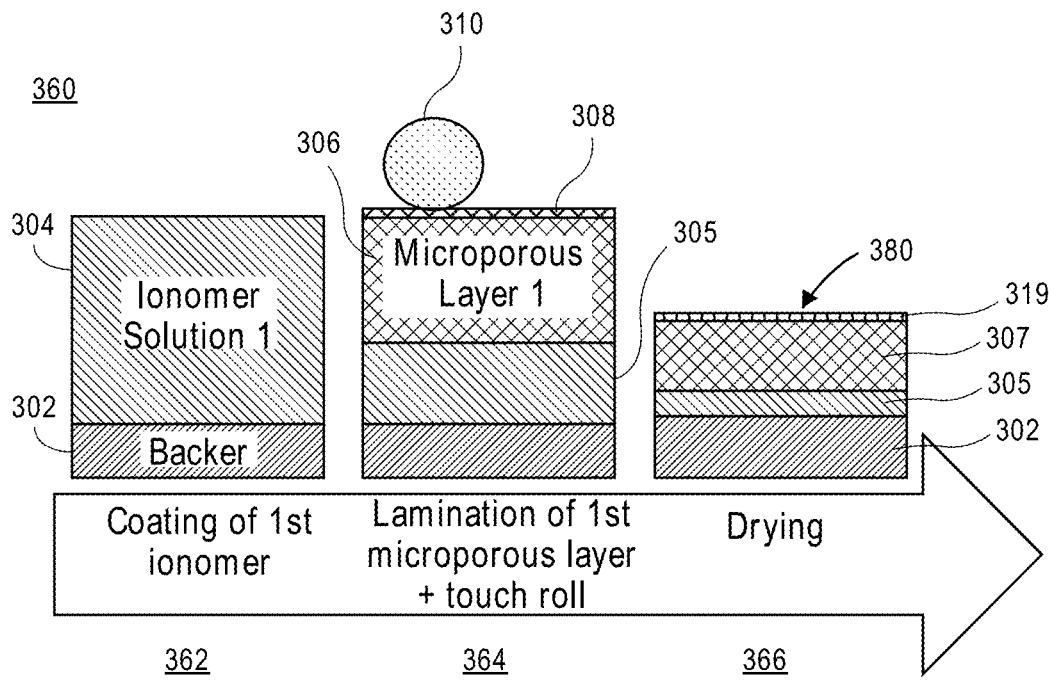

FIGS. 3B-3C show exemplary flow diagrams of processes 340 and 360 for constructing exemplary composite membranes 300 and 380, respectively, in accordance with various aspects of the disclosure. The flow diagrams illustrate the architecture, functionality, and operation of possible implementations of systems and methods according to various embodiments of the present disclosure. In some alternative implementations, where it makes logical sense to do so, the functions noted in each block may occur out of the order noted in the figure. For example, two blocks shown in succession may, in fact, be executed substantially concurrently, or the blocks may sometimes be executed in the reverse order, depending upon the functionality, process, or end product involved.

Referring to FIG. 3B, exemplary flow diagram of process 340 illustrates a method for forming a composite material 300 having a fully imbibed microporous polymer structure 307, an additional layer of ion exchange material 305 and an uncoated non-occlusive layer 309. The process 340 incudes providing a support structure like a backer 302.

Suitable support structures may comprise woven materials which may include, for example, scrims made of woven fibers of expanded porous polytetrafluoroethylene; webs made of extruded or oriented polypropylene or polypropylene netting, commercially available from Conwed, Inc. of Minneapolis, Minn.; and woven materials of polypropylene and polyester, from Tetko Inc., of Briarcliff Manor, N.Y. Suitable non-woven materials may include, for example, a spun-bonded polypropylene from Reemay Inc. of Old Hickory, Tenn. In other aspects, the support structure can include web of polyethylene ("PE"), polystyrene ("PS"), cyclic olefin copolymer ("COC"), cyclic olefin polymer ("COP"), fluorinated ethylene propylene ("FEP"), perfluoroalkoxy alkanes ("PFAs"), ethylene tetrafluoroethylene ("ETFE"), polyvinylidene fluoride ("PVDF"), polyetherimide ("PEI"), polysulfone ("PSU"), polyethersulfone ("PES"), polyphenylene oxide ("PPO"), polyphenyl ether ("PPE"), polymethylpentene ("PMP"), polyethyleneterephthalate ("PET"), or polycarbonate ("PC"). In some aspects, the support structure also includes a protective layer, which can include polyethylene (PE), polystyrene ("PS"), cyclic olefin copolymer ("COC"), cyclic olefin polymer ("COP"), fluorinated ethylene propylene ("FEP"), perfluoroalkoxy alkanes ("PFAs"), ethylene tetrafluoroethylene ("ETFE"), polyvinylidene fluoride ("PVDF"), polyetherimide ("PEI"), polysulfone ("PSU"), polyethersulfone ("PES"), polyphenylene oxide ("PPO"), polyphenyl ether ("PPE"), polymethylpentene ("PMP"), polyethyleneterephthalate ("PET"), or polycarbonate ("PC").

In yet other aspects, support structure can include support structure optionally may include a reflective layer that includes a metal substrate (e.g., an aluminum substrate). The specific metal chosen may vary widely so long as it is reflective. A non-limiting list of exemplary metals includes: aluminum, beryllium, cerium, chromium, copper, germanium, gold, hafnium, manganese, molybdenum, nickel, platinum, rhodium, silver, tantalum, titanium, tungsten, zinc, or alloys such as Inconel or bronze. The reflective layer optionally comprises a mixture or alloy of two or more metals, optionally two or more of the metals listed above. The reflective layer optionally can include a high reflectivity polymeric multilayer film such as Vikuiti™ Enhanced Specular Reflector available from 3M company. In yet another example, the reflective layer optionally can include a high reflectivity non-metal inorganic dielectric multilayer film comprised of materials such as, for example, magnesium fluoride, calcium fluoride, titanium dioxide, silicon dioxide.

At step 342, a first ion exchange material is applied as a layer of controlled thickness to the support structure in a single or multiple pass ionomer coating technique including forward roll coating, reverse roll coating, gravure coating, doctor coating, kiss coating, slot die coating, slide die coating, as well as dipping, brushing, painting, and spraying. The first ion exchange material may be prepared by dissolving an ion exchange material in a solvent. The first ion exchange material may comprise ion exchange material and a solvent, and optionally additional components such as a surfactant. In some embodiments, the ion exchange material is a cation exchange material, an anion exchange material, or an ion exchange material containing both cation and anion exchange capabilities. The choice of solvent may depend, in part, on both the composition of the ionomer and the composition of the porous substrate.

At step 344, an untreated microporous polymer structure is laminated over at least a portion of the first ion exchange material by any conventional technique, such as, for example, hot roll lamination, ultrasonic lamination, adhesive lamination, contact lamination or forced hot air lamination so long as the technique does not damage the integrity of the untreated microporous polymer structure. In some embodiments, the untreated microporous polymer structure comprises ePTFE having a microporous polymer structure. The microporous polymer structure can be characterized by uniform structure and composition throughout its entire thickness. In other aspects, structure and composition of microporous polymer structure can vary throughout its thickness. The prepared or obtained microporous polymer structure may have a thickness of less than 400 microns, for example from 1 microns to 400 microns at 0% relative humidity. The mass per unit area of the untreated microporous polymer structure may be greater than 0.05 g/m$^2$, for example from 0.3 g/m$^2$ to 80 g/m$^2$ at 0% relative humidity.

For example, a carrier support like a backer can be continuously fed from a roller unwind station via alignment and tension rollers to a coating station. The ion exchange material can be applied as a layer of controlled thickness onto the surface of the carrier support (backer) by suitable coating means, such as, for example, a doctor blade. The untreated microporous polymer structure may be continuously fed from a roller unwind station to an alignment roller and contacts the coated carrier support and is impregnated with ion exchange material. Alternatively, the carrier support can be eliminated and the layer of ion exchange material can be directly applied to the untreated microporous polymer structure.

At step 346, the treated microporous polymer structure is placed into an oven to dry and thermally anneal and finalize construction of a composite membrane. The oven temperature may be greater than 60° C., for example from 60° to 220° C. or from 150° to 200° C. Drying and thermally annealing the treated microporous polymer structure in the oven causes the ion exchange material to become securely adhered to the internal membrane surfaces, and optionally the external membrane surfaces, e.g., the fibrils and/or nodes of the microporous polymer structure. The resulting dried and annealed composite membrane 300 may have a thickness of larger than 17 microns, for example from 17 microns to 100 microns at 0% relative humidity. The mass of the composite membrane may be greater than 30 g/m$^2$, for example from 30 g/m$^2$ to 200 g/m$^2$ at 0% relative humidity.

Referring now to FIG. 3C, exemplary flow diagram of process 360 illustrates a method for forming a composite material 380 having a fully imbibed microporous polymer structure 307, an additional layer of ion exchange material 305 and a partially coated non-occlusive layer 319. The process 360 incudes providing a support structure (e.g. backer) 302, such as a woven material, similar to the process 340.

At step 362, a first ion exchange material is applied as a layer of controlled thickness to the support structure (backer) similar to step 342 of the process 340. The description of step 362 is omitted here as it is identical to step 342 of the process 340, described above.

At step 364, an untreated microporous polymer structure is laminated over a first portion of the first ion exchange material by any conventional technique, such as, hot roll lamination, ultrasonic lamination, adhesive lamination, contact lamination or forced hot air lamination so long as the technique does not damage the integrity of the untreated microporous polymer structures. In some embodiments, the untreated microporous polymer structure comprises ePTFE having a microporous polymer structure. The microporous polymer structure can be characterized by uniform structure and composition throughout its entire thickness. In other aspects, structure and composition of the microporous polymer structure can vary throughout its thickness.

After the lamination, a touch roll 310 may be used to coat a top portion of the microporous polymer structure with, for example, ionomer coating.

Step 366 is similar to step 346 of the process 340. Accordingly, the description of step 366 is omitted here. The dried and annealed prepared or obtained microporous polymer structure may have a thickness of more than 17 microns, for example from 17 microns to 100 microns at 0% relative humidity. The mass of the composite membrane may be greater than 30 g/m$^2$, for example from 30 g/m$^2$ to 200 g/m$^2$ at 0% relative humidity.

Figure 3D:
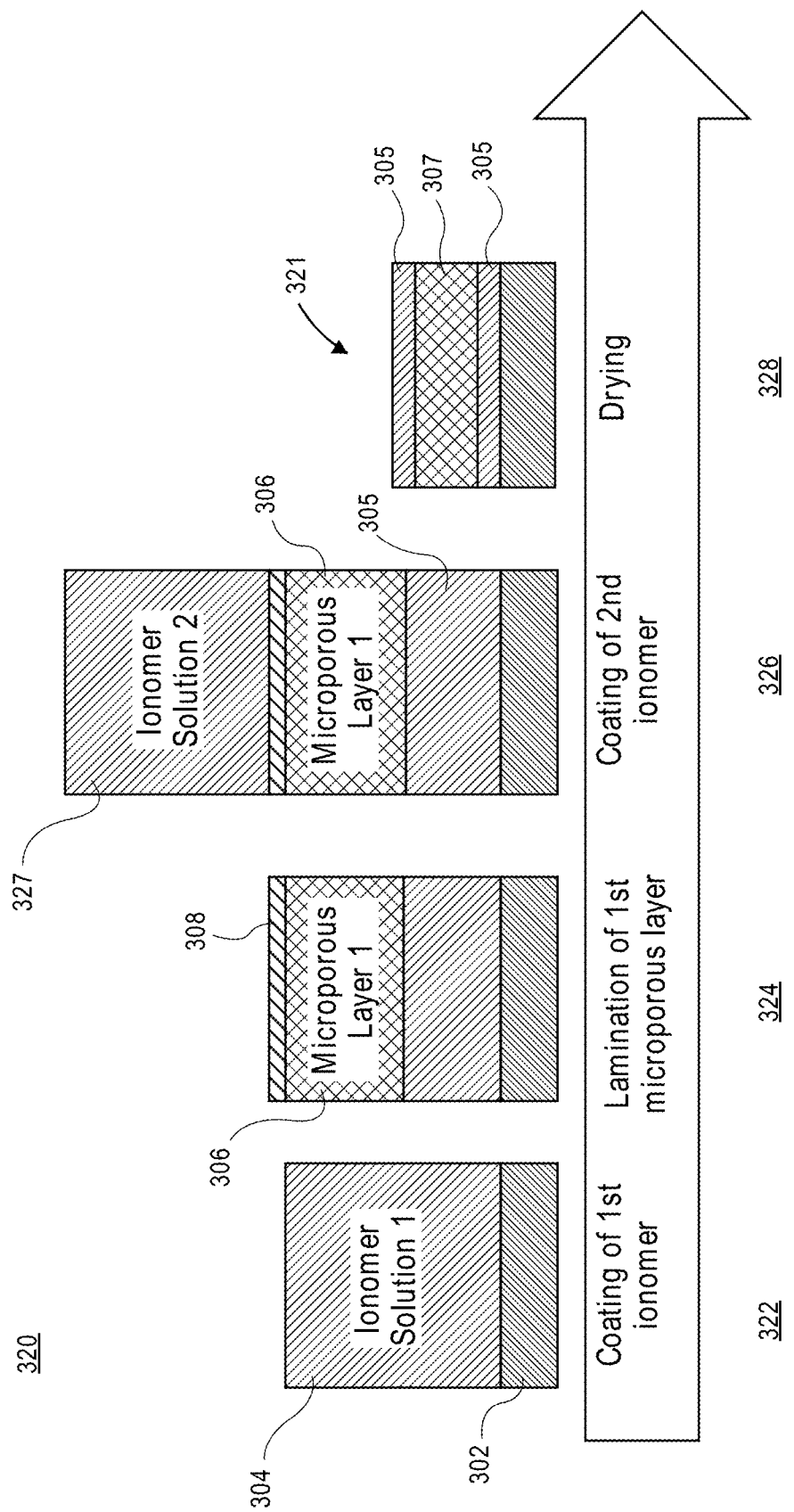

Referring now to FIG. 3D, exemplary flow diagram of process 320 illustrates a method for forming a composite material 321 having a fully imbibed microporous polymer structure 307, and two additional layers of ion exchange material 305. The process 320 incudes providing a support structure (e.g. backer) 302, such as a woven material, similar to the processes 340 and 360.

At step 322, a first ion exchange material is applied as a layer of controlled thickness to the support structure (backer) similar to step 342 of the process 340. The description of step 322 is omitted here as it is identical to step 342 of the process 340, described above.

At step 324, an untreated microporous polymer structure is laminated over a first portion of the first ion exchange material by any conventional technique, such as, hot roll lamination, ultrasonic lamination, adhesive lamination, contact lamination or forced hot air lamination so long as the technique does not damage the integrity of the untreated microporous polymer structures. In some embodiments, the untreated microporous polymer structure comprises ePTFE having a microporous polymer structure. The microporous polymer structure can be characterized by uniform structure and composition throughout its entire thickness. In other aspects, structure and composition of the microporous polymer structure can vary throughout its thickness.

After the lamination, at step 326, a second ion exchange material 327 is applied as a layer of controlled thickness to the top side of microporous polymer structure using ionomer coating technique including forward roll coating, reverse roll coating, gravure coating, doctor coating, kiss coating, slot die coating, slide die coating, as well as dipping, brushing, painting, and spraying. The second ion exchange material may be prepared by dissolving an ion exchange material in a solvent. The second ion exchange material may comprise ion exchange material and a solvent, and optionally additional components such as a surfactant. In some embodiments, the ion exchange material is a cation exchange material, an anion exchange material, or an ion exchange material containing both cation and anion exchange capabilities. The choice of solvent may depend, in part, on both the composition of the ionomer and the composition of the porous substrate.

Step 328 is similar to step 346 of the process 340. Accordingly, the description of step 328 is omitted here. The dried and annealed prepared or obtained composite membrane may have a thickness of more than 17 microns, for example from 17 microns to 100 microns at 0% relative humidity. The mass of the composite membrane may be greater than 30 g/m$^2$, for example from 30 g/m$^2$ to 200 g/m$^2$ at 0% relative humidity.

Processes 340, 360 and 320 may include optional steps of submerging the composite membrane and boiling the composite membrane. For example, in embodiments in which a surfactant is employed, the composite membrane is further processed to remove the surfactant. This is accomplished by soaking or submerging the composite membrane in a solution of, for example, water, isopropyl alcohol, hydrogen peroxide, methanol, and/or glycerin. During this step, the surfactant, which was originally mixed in solution with the ion exchange material, is removed. This soaking or submerging causes a slight swelling of the composite membrane, however the ion exchange material remains within the interior volume of the porous substrate.

At optional step of boiling, the composite membrane is treated by boiling in a suitable swelling agent, preferably water, causing the composite membrane to slightly swell in the x, y, and z direction. The swollen composite membrane has a higher and stronger ion transport rate. The swollen composite membrane retains its mechanical integrity and dimensional stability unlike membranes consisting only of the ion exchange material, and simultaneously maintains desired ionic transport characteristics. A correlation exists between the content of the swelling agent within composite membrane and transport properties of the composite membrane. A swollen composite membrane will transport chemical species faster than an un-swollen composite membrane.

As shown in FIGS. 3B-3D, a composite membrane 300, 380, 321 includes a microporous polymer structure 306 and an ion exchange material (e.g. ionomer) 304 impregnated in the microporous polymer structure 306. That is, the microporous polymer structure 306 is imbibed with the ion exchange material 304. The ion exchange material 304 may substantially impregnate the microporous polymer structure 306 so as to render the interior volume substantially occlusive (i.e. the interior volume having structures that is characterized by low volume of voids and being highly impermeable to gases). For example, by filling greater than 90% of the interior volume of the microporous polymer structure 306 with the ion exchange material 304, substantial occlusion will occur and membrane will be characterized by Gurley numbers larger than 10000 s. The ion exchange material 304 is securely adhered to the internal and external surfaces of the microporous polymer structure 306, e.g., the fibrils and/or nodes of the microporous polymer structure 306 forming an imbibed layer 307.

In some embodiments, the ion exchange material 304, in addition to being impregnated in the microporous polymer structure 306 in the imbibed layer 307, is provided as one or more additional layers 305 (e.g., referred also as "butter coat (BC)") on one or more external surfaces of the imbibed layer 307.

As illustrated in the composite membrane 300 shown in FIG. 3B, part of the microporous polymer structure 306 (e.g. top surface area or bottom surface area) may include a non-occlusive (i.e. the interior volume having structures that is characterized by high volume of voids and being highly permeable to gases) layer 309 that is free or substantially free of the ion exchange material 304. The location of the non-occlusive layer 309 is not limited to the top surface area of the microporous polymer structure 306. As provided above, the non-occlusive layer 309 may be provided on a bottom surface area of the microporous polymer structure 306.

As illustrated in the composite membrane 380 shown in FIG. 3C, the non-occlusive layer 319 may include a small amount of the ion exchange material 304 present in an internal surface of the microporous polymer structure 306 as a thin node and fibril coating. However, the amount of the ion exchange material 304 may be not be large enough to render the microporous polymer structure 306 occlusive, thereby forming the non-occlusive layer 319.

In some embodiments, the composite membrane 300, 380, 321 may be provided on a support layer 302. The support layer 302 may include a backer, a release film such as, for example, cycloolefin copolymer (COC) layer. In some embodiments, the composite membrane 300, 380, 321 may be released (or otherwise uncoupled) from the support layer 302 prior to being incorporated in a membrane electrode assembly (MEA).

FIGS. 3B-3D illustrate exemplary composite membranes 300, 380, 321 that include a single type of ion exchange material 304. However, the application is not limited to composite membranes having a single type of ion exchange material 304 or a single imbibed layer 307.

Figure 3E:
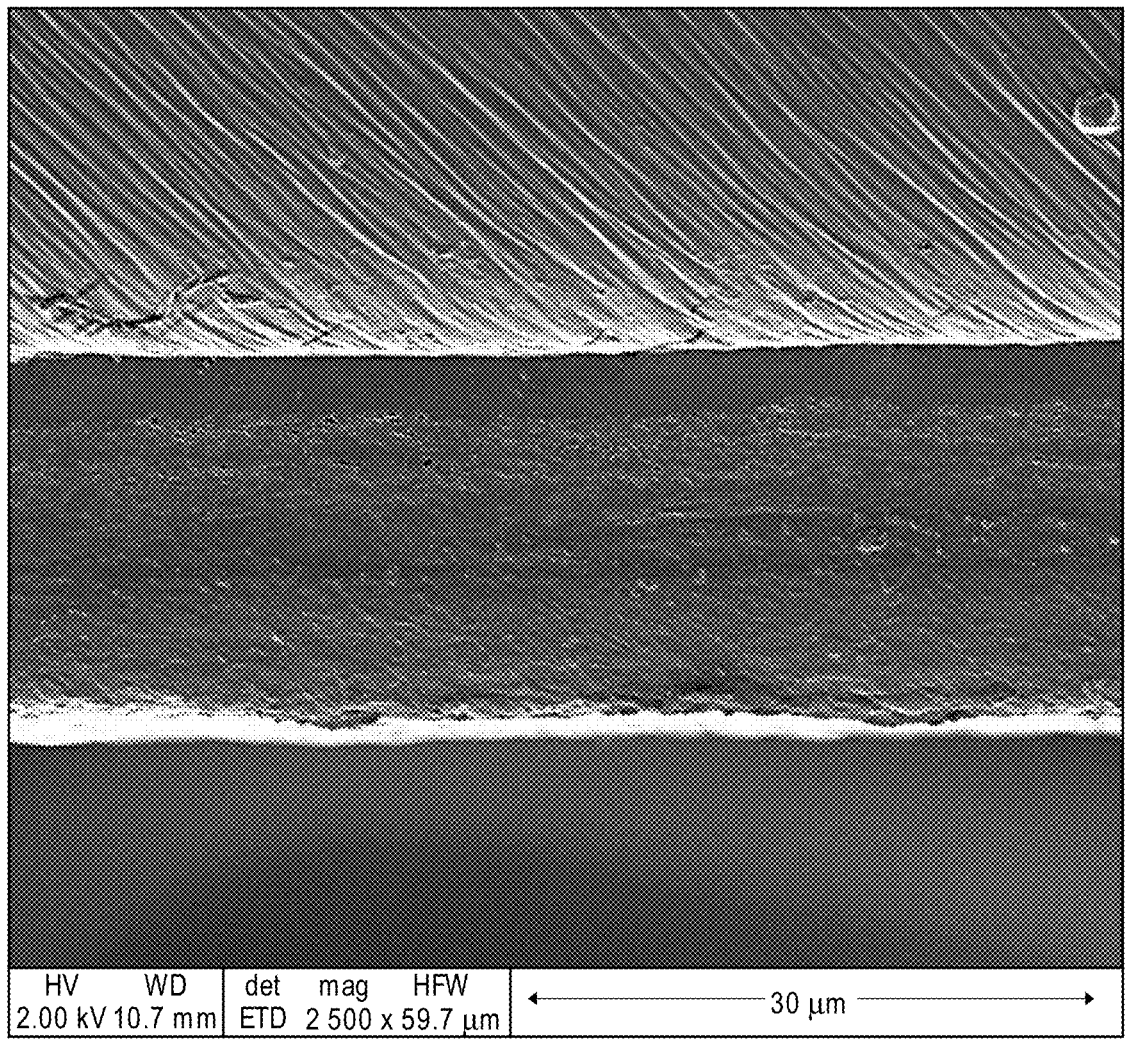
FIGS. 3E-3F show photomicrographs of a composite membrane with porous substrate characterized by nodes interconnected by fibrils and a continuous ionomer phase, according to various embodiments.
Figure 3F:
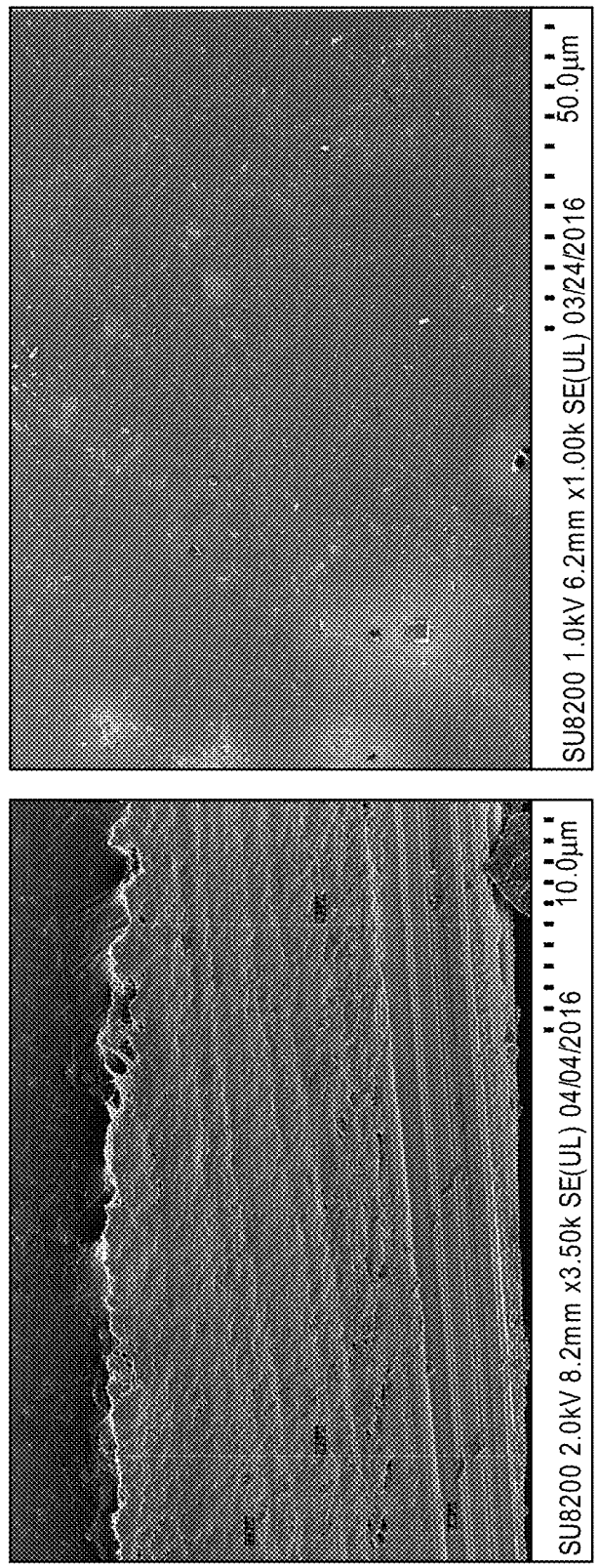

FIGS. 3E-3F illustrate photomicrographs of a composite membrane with porous substrate characterized by nodes interconnected by fibrils and a continuous ionomer phase, according to various embodiments. As shown in FIGS. 3E-3F, a composite membrane prepared in accordance with aspects of the present invention has a uniform thickness free of any internal interfaces in a layer of ionomer or between multiple coatings of the ionomer, and free of any discontinuities or pinholes on the surface. The interior volume of the composite membrane is substantially occluded such that the composite membrane is impermeable to non-polar gases and to the bulk flow of liquids.

c. Preparation and Application of the Impregnant Solution

Referring back to steps 342, 362 and 322, further details about the preparation and application of an impregnant solution on the support structure is described next.

The impregnant solution is prepared by dissolving an ion exchange material in a solvent. The impregnant solution comprising the ion exchange material in the solvent, and optionally other components such as a surfactant. The ion exchange material is a cation exchange material, an anion exchange material, or an ion exchange material containing both cation and anion exchange capabilities. The choice of solvent will depend, in part, on both the composition of the impregnant and the composition of the porous substrate.

The impregnant solution may be applied as a layer of controlled thickness to the untreated porous substrate in a single pass ionomer coating technique including forward roll coating, reverse roll coating, gravure coating, doctor coating, kiss coating, as well as dipping, brushing, painting, and spraying so long as the liquid solution is able to penetrate the interstices and interior volume of the untreated porous substrate. Excess solution from the surface of the treated porous substrate may be removed. For example, a carrier support can be continuously fed from a roller unwind station via alignment and tension rollers to a coating station. The impregnant solution can be applied as a layer of controlled thickness onto the surface of the carrier support by suitable coating means, such as, for example, a doctor blade. The untreated porous substrate may be continuously fed from a roller unwind station to an alignment roller and contacts the coated carrier support and is impregnated with impregnant solution. Alternatively, the carrier support can be eliminated and the layer of impregnant solution can be directly applied to the untreated porous substrate.

The resulting treated porous substrate or composite membrane made with single pass ionomer coating has a thickness in the range of 7 to 100 microns, 17 to 50 microns, or 25 to 40 microns and optionally comprises between 3 g/m$^2$ and 80 g/m$^2$ of porous substrate, or 5 g/m$^2$ and 50 g/m$^2$ of porous substrate, or 10 g/m$^2$ and 30 g/m$^2$ of porous substrate. As should be understood, the single pass ionomer coating results in a composite membrane having a continuous ionomer phase that does not have internal interfaces in a single coating of ionomer.

In some embodiments, the impregnant solution is applied as multiple additional layers of controlled thickness (i.e., a multiple pass ionomer) to a surface of the treated porous substrate by a similar coating technique, such as, for example, forward roll coating, reverse roll coating, gravure coating, doctor coating, kiss coating, as well as dipping, brushing, painting, and spraying. For example, the treated porous substrate may be continuously fed to an alignment roller and contacts the coated carrier support one or more additional times (multiple passes) and is impregnated with impregnant solution. Alternatively, the carrier support can be eliminated and the layer of impregnant solution can be directly applied multiple times to the treated porous substrate. This process can be repeated any number of times (e.g., twice) without a drying step between each pass of coating to create the treated porous substrate with multiple layers. The resulting multiple pass composite membrane, has a thickness in the range of 10 to 150 microns at 0% RH, 15 to 80 microns at 0% RH, or 20 to 60 microns at 0% RH and optionally comprises between 3 g/m$^2$ and 80 g/m$^2$ of porous substrate, or 5 g/m$^2$ and 50 g/m$^2$ of porous substrate, or 10 g/m$^2$ and 30 g/m$^2$ of porous substrate. As should be understood, the multiple pass ionomer coating results in one or multiple layers of treated porous substrate having a continuous ionomer phase that does not have internal interfaces in a layer of ionomer or between the multiple coatings of the ionomer.

In alternative embodiments, another untreated porous substrate may be brought into contact with the coated and treated porous substrate, and the untreated porous substrate is impregnated with the impregnant solution to create a treated porous substrate with multiple layers (i.e., a multiple pass ionomer composite membrane). This process can be repeated any number of times (e.g., twice) without a drying step between each pass of coating to create the treated porous substrate with multiple layers. The resulting multiple pass composite membrane, has a thickness in the range of 10 to 150 microns at 0% RH, 15 to 80 microns at 0% RH, or 20 to 60 microns at 0% RH and optionally comprises between 3 g/m$^2$ and 80 g/m$^2$ of porous substrate, or 5 g/m$^2$ and 50 g/m$^2$ of porous substrate, or 10 g/m$^2$ and 30 g/m$^2$ of porous substrate. As should be understood, the multiple pass ionomer coating results in a composite membrane with one or multiple layers of treated porous substrate having a continuous ionomer phase that does not have internal interfaces in a layer of ionomer or between the multiple coatings of the ionomer.

The treated porous substrate may be placed into an oven to dry and thermally anneal. Oven temperatures may range from 60° to 220° C., but preferably between 150° and 200° C. Drying and thermally annealing the treated porous substrate in the oven causes the ion exchange material to become securely adhered to the internal membrane surfaces and optionally to the external membrane surfaces, e.g., the fibrils and/or nodes of the porous substrate.

In embodiments in which a surfactant is employed, the treated porous substrate is further processed to remove the surfactant. This is accomplished by soaking or submerging the treated porous substrate in a solution of, for example, water, isopropyl alcohol, hydrogen peroxide, methanol, and/or glycerin. During this step, the surfactant, which was originally mixed in solution with the ion exchange material, is removed. This soaking or submerging causes a slight swelling of the treated porous substrate, however the ion exchange material remains within the interior volume of the porous substrate.

The treated porous substrate is treated by boiling in a suitable swelling agent, preferably water, causing the membrane to slightly swell in the x, y, and z direction. The swollen treated porous substrate has a higher and stronger ion transport rate. The swollen treated porous substrate retains its mechanical integrity and dimensional stability unlike membranes consisting only of the ion exchange material, and simultaneously maintains desired ionic transport characteristics. A correlation exists between the content of the swelling agent within treated porous substrate and transport properties of the treated porous substrate. A swollen treated porous substrate will transport chemical species faster than an un-swollen treated porous substrate.

d. Properties of the Composite Membrane

Composite membranes having a continuous ionomer phase in accordance with aspects of the present invention have a predetermined clarity. Haze refers to the optical distinctness with which an object can be seen when viewed through the composite membrane, and can be measured with a Haze meter or transparency meter. In some embodiments, the haze of a composite membrane with continuous ionomer phase formed via a single pass ionomer coating is between 5% and 95%, or 10% and 90%, or 20% and 85%. In alternative embodiments, the haze of a continuous ionomer phase formed via multiple passes of ionomer coating without a drying step between each pass of coating is between 5% and 95%, or 10% and 90%, or 20% and 85%.

III. Flow Batter

Figure 4:
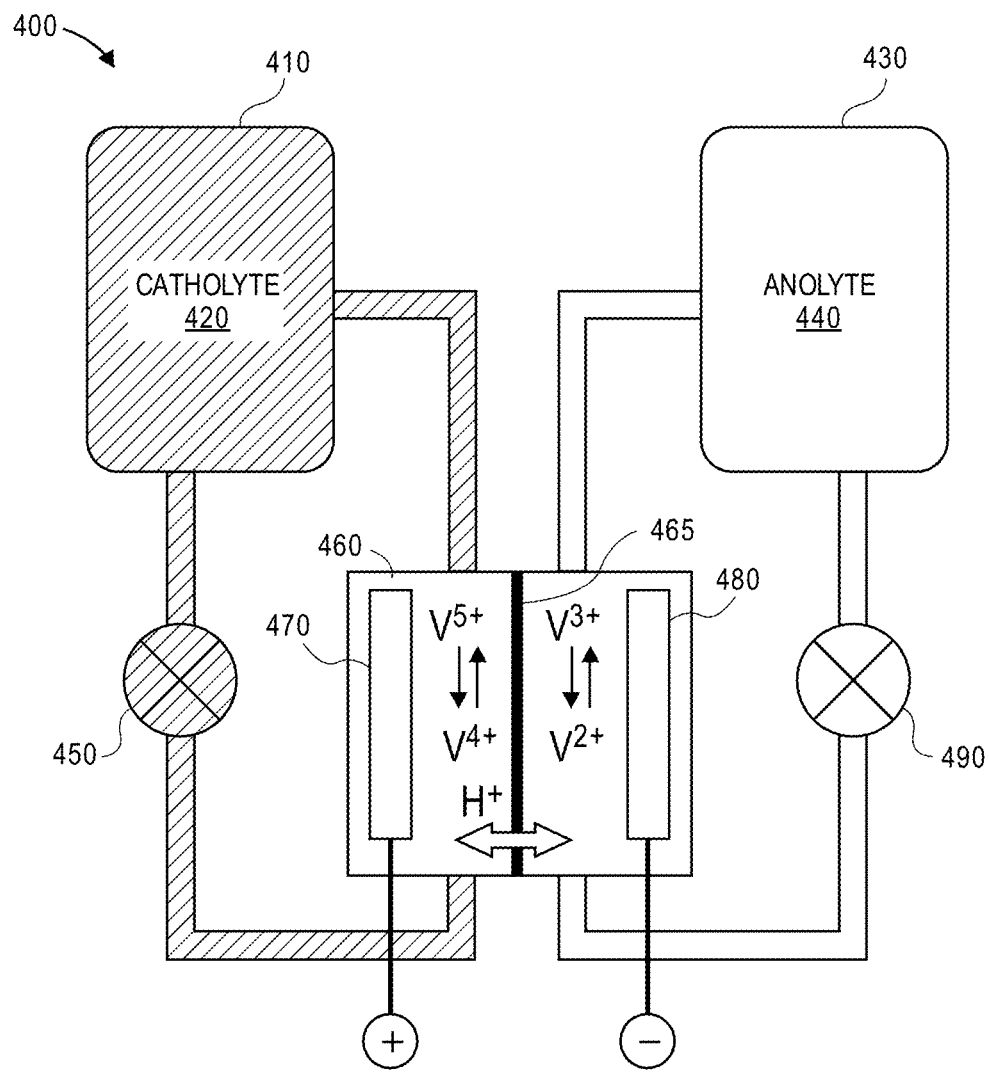
FIG. 4 shows schematic of a flow battery comprising a composite membrane in accordance with some aspects of the invention.

As discussed above, the composite membrane manufactured in accordance with aspects of the present invention (see, e.g., FIGS. 3A-3F) may be incorporated in a flow battery (e.g. a redox flow battery). As shown in FIG. 4, a flow battery 400 is provided in accordance with aspects of the present invention. Flow battery 400 is a fully rechargeable electrical energy storage device comprising a reservoir 410 including a catholyte or positive electrolyte fluid 420 and a second reservoir 430 including an anolyte or negative electrolyte fluid 440. The catholyte 420 may be an electrolyte containing specified redox ions which are in an oxidized state and are to be reduced during the discharge process of flow battery 400, or are in a reduced state and are to be oxidized during the charging process of the flow battery 400, or which are a mixture of these oxidized ions and ions to be oxidized. The anolyte 440 may be an electrolyte, containing redox ions which are in a reduced state and are to be oxidized during a discharge process of the flow battery 400, or are in an oxidized state and are to be reduced during the charging process of the flow battery 900, or which are a mixture of reduced ions and ions to be reduced.

The catholyte 420 is circulated via pump 450 through an exchange region 460 comprising a composite membrane 465 positioned between a positive electrode 470 and a negative electrode 480. The anolyte 440 is circulated via pump 490 also through the exchange region 460. The composite membrane 465 is manufactured in accordance with aspects of the present invention (see, e.g., FIGS. 3A-3D).

In some embodiments, the amount of the catholyte 420 and the anolyte 440 provided to the exchange region 460 may be varied depending on a pumping operation of the pumps 450 and 490, and accordingly, the amount of power generated by reaction of electrolytes in the exchange region 460 may be varied. Both the catholyte 420 and the anolyte 440 circulate in their own respective space promoting reduction/oxidation chemical processes on both sides of the composite membrane 465 resulting in an electrical potential. Cell voltage may be chemically determined by the Nernst equation, and ranges from 0.5 to 5.0 volts or from 0.8 to 1.7 volts.

IV. Test Procedures

A. Tests for the Ion Exchange Material

(a) Solids Concentration of Solutions of the Ion Exchange Material (IEM)

Herein, the terms "solution" and "dispersion" are used interchangeably when referring to IEMs. This test procedure is appropriate for solutions in which the IEM is in proton form, and in which there are negligible quantities of other solids. A volume of 2 cubic centimeters of IEM solution was drawn into a syringe and the mass of the syringe with solution was measured via a balance in a solids analyzer (obtained from CEM Corporation, USA). The mass of two pieces of glass fiber paper (obtained from CEM Corporation, USA) was also measured and recorded. The IEM solution was then deposited from the syringe into the two layers of glass fiber paper. The glass fiber paper with the ion exchange material was placed into the solids analyzer and heated up to 160° C. to remove the solvent liquids. Once the mass of the glass fiber paper and residual solids stopped changing with respect to increasing temperature and time, it was recorded. It is assumed that the residual IEM contained no water (i.e., it is the ionomer mass corresponding to 0% RH). After that, the mass of the emptied syringe was measured and recorded using the same balance as before. The ionomer solids in solution was calculated according to the following formula:

$$\left\{ \begin{matrix} \text{wt \% solids of} \\ \text{IEM solution} \end{matrix} \right\} = \frac{\left\{ \begin{matrix} \text{Mass of glass} \\ \text{fiber paper with} \\ \text{residual solids} \end{matrix} \right\} - \left\{ \begin{matrix} \text{Mass of} \\ \text{glass fiber} \\ \text{paper} \end{matrix} \right\}}{\left\{ \begin{matrix} \text{Mass of} \\ \text{full syringe} \end{matrix} \right\} - \left\{ \begin{matrix} \text{Mass of} \\ \text{emptied syringe} \end{matrix} \right\}} = [\text{wt \%}]$$

(b) Equivalent Weight of the Ion Exchange Material (IEM)

The following test procedure is appropriate for IEM comprised of a single ionomer resin or a mixture of ionomer resins that is in the proton form (i.e., that contains negligible amounts of other cations), and that is in a solution that contains negligible other ionic species, including protic acids and dissociating salts. If these conditions are not met, then prior to testing the solution must be purified from ionic impurities according to a suitable procedure as would be known to one of ordinary skill in the art, or the impurities must be characterized and their influence on the result of the EW test must be corrected for.

As used herein, the EW of an IEM refers to the case when the IEM is in its proton form at 0% RH with negligible impurities. The IEM may comprise a single ionomer or a mixture of ionomers in the proton form. An amount of IEM solution with solids concentration determined as described above containing 0.2 grams of solids was poured into a plastic cup. The mass of the ion exchange material was measured via a conventional laboratory scale (obtained from Mettler Toledo, LLC, USA). Then, 5 ml of deionized water and 5 ml of 200 proof denatured ethanol (SDA 3C, Sigma Aldrich, USA) is added to ion exchange material in the cup. Then, 55 ml of 2N sodium chloride solution in water was added to the IEM solution. The sample was then allowed to equilibrate under constant stirring for 15 minutes. After the equilibration step, the sample was titrated with 1N sodium hydroxide solution. The volume of 1N sodium hydroxide solution that was needed to neutralize the sample solution to a pH value of 7 was recorded. The EW of the IEM ($EW_{IEM}$) was calculated as:

$$EW_{IEM} = \frac{\{\text{Mass of IEM solution}\} \times \{\text{wt \% solids of IEM solution}\}}{\{\text{Volume of NaOH solution}\} \times \{\text{Normality of NaOH solution}\}} = \left[\frac{g}{\text{mole eq.}}\right]$$

When multiple IEMs were combined to make a composite membrane, the average EW of the IEMs in the composite membrane was calculated using the following formula:

$$EW_{IEM\_average} = \left[\frac{\{\text{Mass fraction of IEM 1}\}}{\{EW_{IEM,1}\}} + \frac{\{\text{Mass fraction of IEM 2}\}}{\{EW_{IEM,2}\}} + \ldots \cdot \frac{\{\text{Mass fraction of IEM N}\}}{\{EW_{IEM,N}\}}\right]^{-1} = \left[\frac{g}{\text{mole eq.}}\right].$$

where the mass fraction of each IEM is with respect to the total amount of all IEMs. This formula was used both for composite membranes containing ionomer blends and for composite membranes containing ionomer layers.

B. Tests for the Porous Membrane (a) Bubble Point of the Porous Membrane

The Bubble Point was measured according to the procedures of ASTM F316-86 (1986). Isopropyl alcohol was used as the wetting fluid to fill the pores of the test specimen. The Bubble Point is the pressure of air required to create the first continuous stream of bubbles detectable by their rise through the layer of isopropyl alcohol covering the microporous polymer matrix. This measurement provides an estimation of maximum pore size.

(b) Gurley Number of the Porous Membrane

Gas flow barrier properties were measured using Gurley Densometer according to ASTM D-726-58 (1971). The procedure includes clamping sample between air permeable plates of the Gurley Densometer. An inner cylinder of known weight that can slide freely is then released. The Gurley number is defined as time in seconds it takes for the released inner cylinder to displace a certain volume of air in the Densometer through the sample material.

(c) Non-Contact Thickness of the Porous Membrane

A sample of microporous polymer structure was placed over a flat smooth metal anvil and tensioned to remove wrinkles. Height of microporous polymer structure on anvil was measured and recorded using a non-contact Keyence LS-7010M digital micrometer. Next, height of the anvil without microporous polymer matrix was recorded. Thickness of the microporous polymer structure was taken as a difference between micrometer readings with and without microporous structure being present on the anvil.

(d) Mass-Per-Area of the Porous Membrane

Each Microporous Polymer structure was strained sufficient to eliminate wrinkles, and then a 10 $cm^2$ piece was cut out using a die. The 10 $cm^2$ piece was weighed on a conventional laboratory scale. The mass-per-area (M/A) was then calculated as the ratio of the measured mass to the known area. This procedure was repeated 2 times and the average value of the M/A was calculated.

(e) Apparent Density of the Porous Membrane

Apparent density of microporous polymer structure was calculated using the non-contact thickness and mass-per-area data using the following formula:

$$\text{Apparent density}_{microporous\ layer} = \frac{\{M/A_{microporous\ layer}\}}{\{\text{non-contact thickness}\}} = [g/cc]$$

C. Tests for the Composite Membrane (a) Thickness of the Composite Membrane

The composite membranes were equilibrated in the room in which the thickness was measured for at least 1 hour prior to measurement. Composite membranes were left attached to the substrates on which the composite membranes were coated. For each sample, the composite membrane on its coating substrate was placed on a smooth, flat, level marble slab. A thickness gauge (obtained from Heidenhain Corporation, USA) was brought into contact with the composite membrane and the height reading of the gauge was recorded in six different spots arranged in grid pattern on the membrane. Then, the sample was removed from the substrate, the gauge was brought into contact with the substrate, and the height reading was recorded again in the same six spots. The average thickness of the composite membrane at a given relative humidity (RH) in the room was calculated as a difference between height readings of the gauge with and without the composite membrane being present on the coating substrate. The local RH in the room was measured using an RH probe (obtained from Fluke Corporation). The thickness at 0% RH was calculated using the following general formula:

Thickness at 0% $RH ==$ $$\left(\frac{\text{Thickness at room } RH - \frac{M/A_{porous\ layer}}{\text{Density}_{porous\ layer}}}{1 + \frac{\lambda_{room\ EH}}{EW_{ionomer\_average}} * \frac{\text{Molecular weight}_{water}}{\text{Density}_{water}} * \text{Density}_{ionomer}}\right) **$$

-continued $$\left(1 + \frac{\lambda_{RH=0\%}}{EW_{ionomer_{average}}} * \frac{\text{Molecular weight}_{water}}{\text{Density}_{water}} * \text{Density}_{ionomer}\right) +$$

$$\frac{M/A_{porous\,layer}}{\text{Density}_{porous\,layer}} == [\text{micron}]$$

where density of porous layer represents the skeletal density (2.25 g/cm³ for ePTFE), density of ionomer represents density of ionomer at 0% RH (1.96 g/cm³ for PFSA ionomer), density of water is taken to be 0.997 g/cm³, molecular weight of water is taken to be 18.015 g/mole, and the parameter λ corresponds to the water uptake of the Ion Exchange Material in terms of moles of water per mole of acid group at a specified RH. For PFSA ionomer, the values for λ at any RH in the range from 0 to 100% in gas phase were calculated according the following formula:

$$\lambda = 80.239 \times RH^6 - 38717 \times RH^5 - 164.451 \times RH^4 + 208.509 \times RH^3 - 91.052 \times RH^2 + 21.740 \times RH^1 + 0.084$$

(b) Mass-Per-Area of Composite Membrane

The following test procedure may be used to determine the mass-per-area composite membrane prepared in accordance with aspects of the present disclosure. A sample of composite material comprising a substrate and a composite membrane of known area, 10 cm², would be cut from a sheet. After cutting, a sample of composite membrane on its coating substrate is then weighed on a conventional laboratory scale and its weight is recorded along with the value of RH around the laboratory scale at the time of measurements. The local RH in the room was measured using an RH probe (obtained from Fluke Corporation). Then, the sample was removed from the substrate, the substrate was weighed using same laboratory scale and substrate's weight was recorded. The weight of the composite membrane at a given RH in the room was calculated as a difference between weight readings of the scale with and without the composite membrane being present on the coating substrate.

A composite membrane mass-per-area at 0% RH is then calculated according to the following formula:

$$M/A_{composite\,membrane\,at\,0\%\,RH} = M/A_{composite\,membrane\,at\,room\,RH\%} -$$

$$\text{Density}_{water} ** (\text{Thickness at room } RH - \text{Thickness at 0\% } RH) = [g/m^2]$$

(c) Haze for the Composite Membrane

Figure 5A:
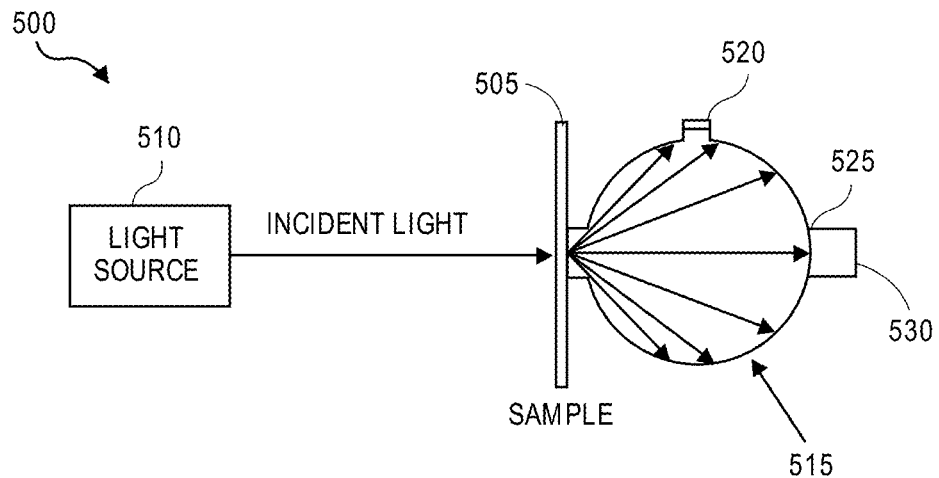
FIGS. 5A-5B show a schematic of a haze test arrangement for measuring total light transmittance of a composite membrane in accordance with some aspects of the invention.
Figure 5B:
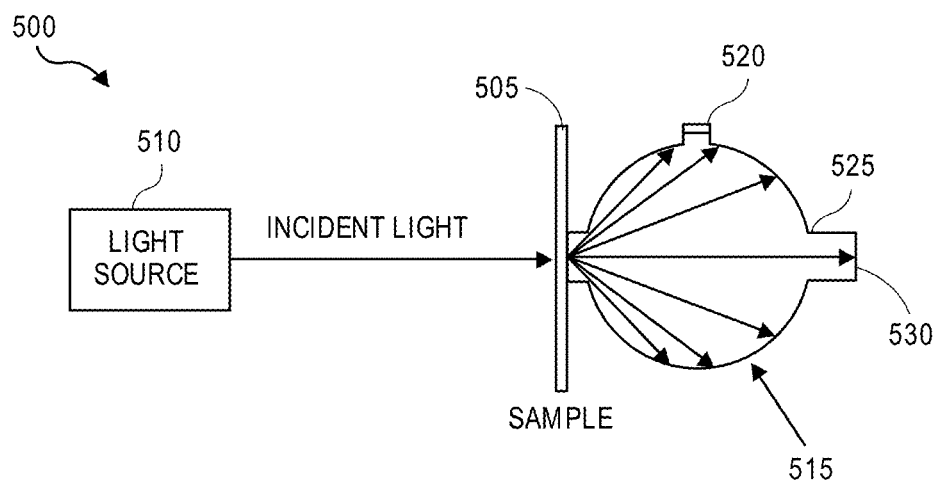

The following haze test procedure was employed on samples of ion exchange membranes having a continuous ionomer phase, which were prepared in accordance with aspects of the present invention (see, e.g., FIGS. 3A-3F). Haze test is performed on the composite membranes that were dried at ambient conditions (e.g., between 20° C. and 22° C., relative humidity of 30-70%) for at least 24 hours prior to the test. As shown in FIGS. 5A and 5B, the haze test procedure includes using a haze meter or transparency meter 500 to determine the wide-angle scattering of light by the ion exchange membrane resulting in loss of optical contrast with which an object can be seen when viewed through the ion exchange membrane. In the haze meter or transparency meter 500 implemented in accordance with aspects of the present invention, a sample 505 (e.g., an ion exchange membrane having a continuous ionomer phase) is placed between a light source 510 and a light integration sphere 515 that is lined with diffusely reflective material and equipped with a light detector 520, a movable diffusely reflective surface 525, and a trap 530 for low angle scattered and directly transmitted light.

Initially, total transmittance of a sample 505 is measured with the low angle scattered and direct transmittance light trap 530 being closed by a diffusively-reflecting surface, as shown in FIG. 5A. The closure of the low angle scattered and direct transmittance light trap 530 results in detection of all light that passed through the sample 505. The total light transmittance is defined as a ratio of light transmitted by the sample to the incident light on the sample. Thereafter, haze of a sample 505 is measured with the low angle scattered and direct transmittance light trap 530 being opened, as shown in FIG. 5B. Opening of low angle scattered and direct transmittance light trap 530 results in detection of only the diffuse component of light that passed through the sample 505. Haze is defined as a ratio of diffuse transmittance to total transmittance of light through a sample.

In some embodiments, the haze of a composite membrane with continuous ionomer phase formed via a single pass ionomer coating is between 5% and 95%, or 10% and 90%, or 20% and 85%. In alternative embodiments, the haze of a continuous ionomer phase formed via multiple passes of ionomer coating without a drying step between each pass of coating is between 5% and 95%, or 10% and 90%, or 20% and 85%.

(d) Blistering of the Composite Membrane

The following blister test procedure was employed on samples of composite membrane which were prepared in accordance with aspects of the present invention (see, e.g., FIGS. 3A-3D). The blister testing procedure includes subjecting each sample of composite membrane to a stress cycle of immersions for 3 minutes into a beaker containing aqueous sulfuric acid solution of 6 mol/L concentration that was at temperature 80° C. and, subsequently, for 1 minute into a beaker containing deionized water that was at ambient conditions (e.g., between 20° C. and 22° C., relative humidity of 30-70%). The stress cycle was repeated consecutively six times. After the stress cycles, each sample of composite membrane was dried at ambient conditions (e.g., between 20° C. and 22° C., relative humidity of 30-70%), and bubble or blister density was counted. The bubble or blister area may be calculated in a number of ways including manual observation and measurement and/or automated techniques such as the use of imaging software. An example of a publicly available imaging processing software that can be used to calculate number of and area of blisters is ImageJ developed at National Institute of Health, USA.

Figure 6A:
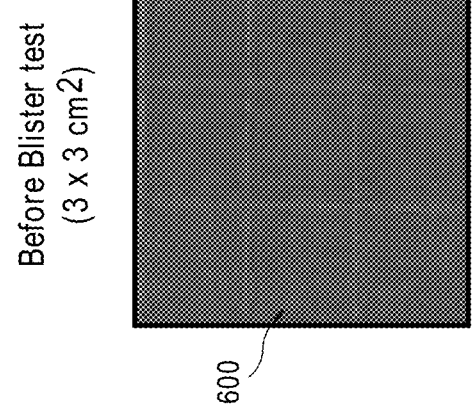
FIGS. 6A-6B show an exemplary composite membrane prepared in accordance with aspects of the present invention and a conventional ion exchange membrane, respectively, before and after the blister test.
Figure 6A:
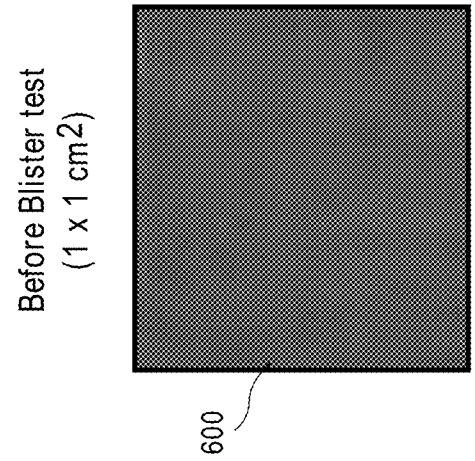
Figure 6A:
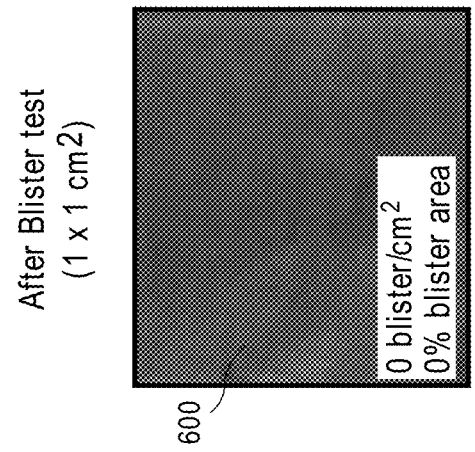
Figure 6B:
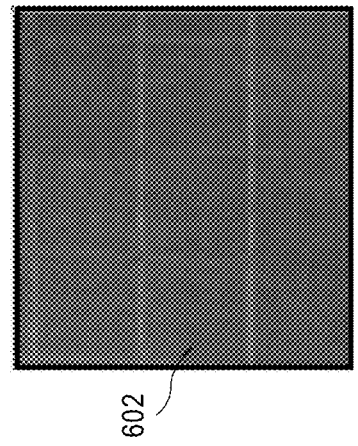
Figure 6B:
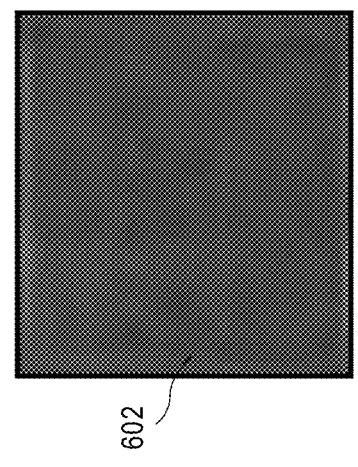
Figure 6B:
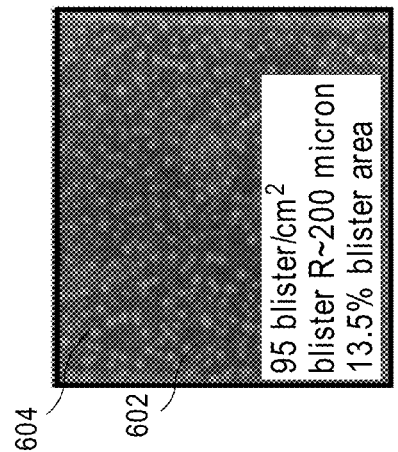

FIGS. 6A-6B show a composite membrane 600 prepared in accordance with aspects of the present invention (see, e.g., FIGS. 3A-3D) and a conventional ion exchange membrane 602 at low resolution of 3×3 cm² and high resolution of 1×1 before the blister test and high resolution of 1×1 cm² after blister test, respectively. As shown in FIG. 6A, both the composite membrane 600 and the conventional ion exchange membrane 602 exhibit no blisters prior to the blister test performed according to the blister test procedure provided above. As shown in FIG. 6B, the composite membrane 600 shows no blisters (i.e. 0 blister/cm²), thus the membrane having 0% blister area, while the conventional ion exchange membrane 602 shows blisters (i.e. 95 blisters/ cm², each blister having a radius of 200 μm and the membrane having 13.5% blister area.

Figure 7C:
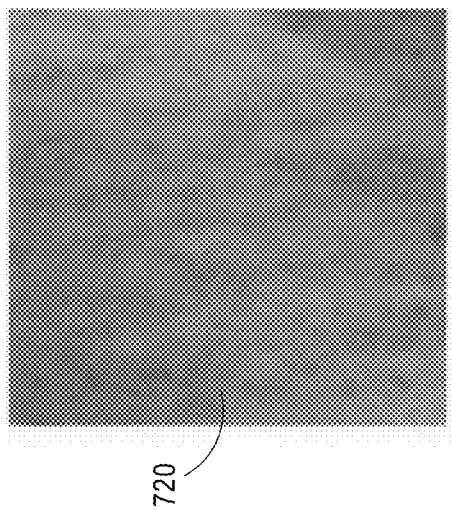
FIGS. 7A-7C show samples of composite membrane prepared in accordance with aspects of the present invention after the blistering test in accordance with some aspects of the invention.
Figure 7B:
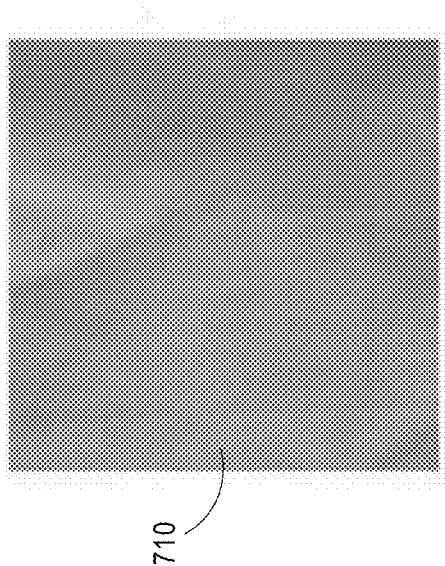
Figure 7A:
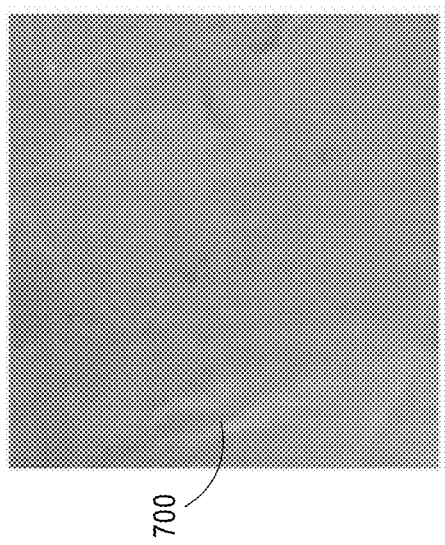

In some embodiments, the bubble or blister area of a composite membrane with continuous ionomer phase formed via a single pass ionomer coating and after exposure to the blister test procedure is less than 0.3%, less than 0.2%, or less than or 0%. In alternative embodiments, the bubble or blister area of a composite membrane with continuous ionomer phase formed via multiple passes of ionomer coating without a drying step between each pass of coating and after exposure to a blister test procedure is less than 0.3%, less than 0.2%, or less than 0.1%, or 0%. FIGS. 7A-7C show samples 700, 710, 720 of composite membrane which were prepared in accordance with aspects of the present invention and have a bubble or blister density of less than 0.1%. In some embodiments, the change in haze of a composite membrane with continuous ionomer phase formed via a single pass ionomer coating and after exposure to the blister test procedure is 0% or less, between 0% and −60%, or between 0% and −45%, or between 0% and −30%, or between 0% and −21%. In alternative embodiments, the change in haze of a composite membrane with continuous ionomer phase formed via multiple passes of ionomer coating without a drying step between each pass of coating and after exposure to a blister test is 0% or less, between 0% and −60%, or between 0% and −45%, or between 0% and −30%, or between 0% and −21%.

V. Examples

Without intending to limit the scope of the present invention, the apparatus and method of production of the present invention may be better understood by referring to the following examples. All samples of ePTFE provided in the following examples were made in accordance with the teachings of U.S. Pat. No. 3,593,566. Summary of the physical characteristics for porous expanded polytetrafluoroethylene (ePTFE) is presented in Table 1.

TABLE 1

Physical Characteristics for porous ePTFE used in the examples

| Membrane ID # | Mass/area g/m2 | Non-contact thickness micron | Apparent density g/cm3 | Gurley sec | Bubble point kPa |
|---|---|---|---|---|---|
| 1 | 30.6 | 137.1 | 0.22 | 26.3 | 300 |
| 2 | 26 | 57.7 | 0.46 | 9.3 | 127 |
| 3 | 18 | 26 | 0.7 | 12.1 | 130 |
| 4 | 10.8 | 30 | 0.36 | 9.8 | 296 |
| 5 | 5.8 | 12.5 | 0.46 | 6.6 | 222 |

1. Comparative Examples—Conventional Multiple Pass Ionomer Manufactured with Drying Between Each Step

Example 1.1

A 26.7 micron thick composite membrane comprised of ion exchange polymer perfluoro sulfonic acid resin with EW of 920 g/(mole acid equivalence) reinforced with two layers of expanded porous ePTFE membrane #5 was prepared using conventional laboratory technique. Initially, a water-ethanol based solution of perfluoro sulfonic acid resin with EW=920 g/mole eq (product FSS2, obtained from Asahi Glass Company) was coated onto a moving carrier substrate using a slot die, and laminated with an ePTFE membrane #5 that was moving in the same direction. The carrier substrate is a polymer sheet (obtained from DAICEL VALUE COATING LTD., Japan) comprising PET and a protective layer of cyclic olefin copolymer (COC), and is oriented with the COC side on top. This laminate was subsequently dried in an oven at 160° C. and annealed at that temperature for 1 minute producing a solid coated structure comprising the carrier substrate coupled to a polymer layer reinforced with expanded porous polytetrafluoroethylene.

Thereafter, another amount of water-ethanol based solution of same perfluoro sulfonic acid resin was applied to the coated structure using a slot die, and laminated with another ePTFE membrane #5 that was moving in the same direction. The laminate was dried again at 160° C. and annealed at that temperature for 1 minute. Finally, another amount of water-ethanol based solution of same perfluoro sulfonic acid resin was applied to the coated structure using a slot die, and dried again at 160° C. and annealed at that temperature for 1 minute. The resulting composite membrane comprised the carrier substrate coupled to a ion exchange polymer layer followed by microporous polytetrafluoroethylene membrane layer with ion exchange polymer embedded within followed by another ion exchange polymer layer followed by another microporous polytetrafluoroethylene membrane layer with ion exchange polymer embedded within followed by another ion exchange polymer layer on top and total thickness of 26.7 micron and mass/area of 54.0 g/m² at 0% RH. The composite membrane was largely transparent with haze value of 5%.

To determine characteristics such as susceptibility of the composite membrane to blistering in an all-liquid environment with variable ionic strength, a blister test procedure was performed as described earlier. The haze for the sample of composite membrane 1.5 with discontinuous ionomer phase after blister testing as described above increased by 320% to the value of 21.0%. The bubble or blister area for the sample of composite membrane with discontinuous ionomer phase prepared as described above was about 13.5% measured as a ratio of the area of the ionomer to the area of the bubbles or blisters in the ionomer. FIG. 6B shows a photograph of the 3 cm×3 cm and 1 cm×1 cm areal view of composite membrane 602 representing example 1.1 before blister test have been conducted and after the blister test been conducted, with the membrane after blister testing having bubbles or blisters 604 in weak internal interfaces in a layer of ionomer or between the multiple coatings of the ionomer.

Example 1.2

A 44.2 micron thick composite membrane comprised of ion exchange polymer perfluoro sulfonic acid resin with EW of 810 g/(mole acid equivalence) reinforced with one layer of expanded porous ePTFE membrane #2 was prepared using conventional laboratory technique. Initially, a of water-ethanol based solution of ion exchange perfluoro sulfonic acid resin with EW=810 g/mole eq. (obtained from Shanghai Gore 3F Fluoromaterials Co., LTD., China) was coated onto carrier substrate restrained in a frame using a draw down bar, and laminated with an ePTFE membrane #2. The carrier substrate is a polymer sheet (obtained from DAICEL VALUE COATING LTD., Japan) comprising PET and a protective layer of cyclic olefin copolymer (COC), and is oriented with the COC side on top. This laminate was subsequently dried in an oven at 160° C. and annealed at that temperature for 1 minute. Thereafter, another amount of water-ethanol based solution of same perfluoro sulfonic acid resin was applied to the coated structure using a draw down bar and dried again at 160° C. and annealed at that temperature for 1 minute. The resulting composite membrane comprised the carrier substrate coupled to a to a ion exchange polymer layer followed by microporous polytetrafluoroethylene membrane layer with the ion exchange polymer embedded within with another ion exchange polymer layer on top and had total thickness of 44.2 micron and mass/area of 90.5 g/m² at 0% RH. The composite membrane was largely transparent with haze value of 4.6%.

To determine characteristics such as susceptibility of the composite membrane to blistering in an all-liquid environment with variable ionic strength, a blister test procedure was performed as described earlier with the membrane after blister testing having bubbles or blisters in weak internal interfaces in a layer of ionomer or between the multiple coatings of the ionomer. The haze for the sample of composite membrane 1.2 with discontinuous ionomer phase after blister testing as described above increased by 35% to the value of 6.3%. The bubble or blister area for the sample of composite membrane 1.2 with discontinuous ionomer phase prepared as described above was about 1.3% measured as a ratio of the area of the ionomer to the area of the bubbles or blisters in the ionomer Example 1.3

A 27.9 micron thick composite membrane comprised of ion exchange polymer perfluoro sulfonic acid resin with EW of 1100 g/(m ole acid equivalence) reinforced with one layer of expanded porous ePTFE membrane #2 was prepared using conventional laboratory technique. Initially, a of water-ethanol based solution of perfluoro sulfonic acid resin with EW=1100 g/mole eq. (D2021, obtained from Ion Power Inc., USA) was coated onto carrier substrate restrained in a frame using a draw down bar, and laminated with an ePTFE membrane #2. The carrier substrate is a polymer sheet (obtained from DAICEL VALUE COATING LTD., Japan) comprising PET and a protective layer of cyclic olefin copolymer (COC), and is oriented with the COC side on top. This laminate was subsequently dried in an oven at 160° C. and annealed at that temperature for 1 minute. Thereafter, another amount of water-ethanol based solution of same perfluoro sulfonic acid resin was applied to the coated structure using a draw down bar and dried again at 160° C. and annealed at that temperature for 1 minute. The resulting composite membrane comprised the carrier substrate coupled to a ion exchange polymer layer followed by microporous polytetrafluoroethylene membrane layer with the ion exchange polymer embedded within with another ion exchange polymer layer on top and had total thickness of 27.9 micron and mass/area of 58.4 g/m² at 0% RH. The composite membrane was largely transparent with haze value of 16.8%.

To determine characteristics such as susceptibility of the composite membrane to blistering in an all-liquid environment with variable ionic strength, a blister test procedure was performed as described earlier with the membrane after blister testing having bubbles or blisters in weak internal interfaces in a layer of ionomer or between the multiple coatings of the ionomer. The haze for the sample of composite membrane 1.3 with discontinuous ionomer phase after blister testing as described above increased by 34% to the value of 22.6%. The bubble or blister area for the sample of composite membrane 1.3 with discontinuous ionomer phase prepared as described above was about 0.5% measured as a ratio of the area of the ionomer to the area of the bubbles or blisters in the ionomer.

Example 1.4

A 22.7 micron thick composite membrane comprised of ion exchange polymer perfluoro sulfonic acid resin with EW of 900 g/(mole acid equivalence) reinforced with one layer of expanded porous ePTFE membrane #3 was prepared using conventional laboratory technique. Initially, a of water-ethanol based solution of perfluoro sulfonic acid resin with EW=900 g/mole eq. (obtained from Shanghai Gore 3F Fluoromaterials Co., LTD., China) was coated onto carrier substrate restrained in a frame using a draw down bar, and laminated with an ePTFE membrane #3. The carrier substrate is a polymer sheet (obtained from DAICEL VALUE COATING LTD., Japan) comprising PET and a protective layer of cyclic olefin copolymer (COC), and is oriented with the COC side on top. This laminate was subsequently dried in an oven at 160° C. and annealed at that temperature for 1 minute. Thereafter, another amount of water-ethanol based solution of same perfluoro sulfonic acid resin was applied to the coated structure using a draw down bar and dried again at 160° C. and annealed at that temperature for 1 minute. The resulting composite membrane comprised the carrier substrate coupled to a ion exchange polymer layer followed by microporous polytetrafluoroethylene membrane layer with the ion exchange polymer embedded within with another ion exchange polymer layer on top and had total thickness of 22.7 micron and mass/area of 47.1 g/m² at 0% RH. The composite membrane was largely transparent with haze value of 19.4%.

To determine characteristics such as susceptibility of the composite membrane to blistering in an all-liquid environment with variable ionic strength, a blister test procedure was performed as described earlier with the membrane after blister testing having bubbles or blisters in weak internal interfaces in a layer of ionomer or between the multiple coatings of the ionomer. The haze for the sample of composite membrane 1.4 with discontinuous ionomer phase after blister testing as described above increased by 45% to the value of 28%. The bubble or blister area for the sample of composite membrane 1.4 with discontinuous ionomer phase prepared as described above was about 0.3% measured as a ratio of the area of the ionomer to the area of the bubbles or blisters in the ionomer.

Example 1.5

A 17.9 micron thick composite membrane comprised of ion exchange polymer perfluoro sulfonic acid resin with EW of 900 g/(mole acid equivalence) reinforced with one layer of expanded porous ePTFE membrane #4 was prepared using conventional laboratory technique. Initially, a of water-ethanol based solution of perfluoro sulfonic acid resin with EW=900 g/mole eq. (obtained from Shanghai Gore 3F Fluoromaterials Co., LTD., China) was coated onto carrier substrate restrained in a frame using a draw down bar, and laminated with an ePTFE membrane #4. The carrier substrate is a polymer sheet (obtained from DAICEL VALUE COATING LTD., Japan) comprising PET and a protective layer of cyclic olefin copolymer (COC), and is oriented with the COC side on top. This laminate was subsequently dried in an oven at 160° C. and annealed at that temperature for 1 minute. Thereafter, another amount of water-ethanol based solution of same perfluoro sulfonic acid resin was applied to the coated structure using a draw down bar and dried again at 160° C. and annealed at that temperature for 1 minute. The resulting composite membrane comprised the carrier substrate coupled to a ion exchange polymer layer followed by microporous polytetrafluoroethylene membrane layer with the ion exchange polymer embedded within with another ion exchange polymer layer on top and had total thickness of 17.9 micron and mass/area of 36.7 g/m$^2$ at 0% RH. The composite membrane was largely transparent with haze value of 5.7%.

To determine characteristics such as susceptibility of the composite membrane to blistering in an all-liquid environment with variable ionic strength, a blister test procedure was performed as described earlier with the membrane after blister testing having bubbles or blisters in weak internal interfaces in a layer of ionomer or between the multiple coatings of the ionomer. The haze for the sample of composite membrane 1.5 with discontinuous ionomer phase after blister testing as described above increased by 31% to the value of 7.5%. The bubble or blister area for the sample of composite membrane 1.5 with discontinuous ionomer phase prepared as described above was about 6.3% measured as a ratio of the area of the ionomer to the area of the bubbles or blisters in the ionomer.

The data for comparative examples 1.1-1.5 is summarized in Table 2.

TABLE 2

Summary of data for Comparative Examples 1.1-1.5

| | | | | Composite membrane | | | | | | |
|---|---|---|---|---|---|---|---|---|---|---|
| Example # | Example Type | Ionomer EW g/mole eq. | ePTFE # | Thickness at 0% RH micron | Mass/area at 0% RH g/m$^2$ | Construction | Haze, Initial % | Haze, After blister test % | Haze change % | Blister area, After blister test % |
| 1.1 | Comparative | 920 | 5 | 26.7 | 54.0 | Two microporous membrane layers with ion exchange polymer embedded within and three ion exchange polymerlayers | 5.0% | 21.0% | 320.0% | 13.5% |
| 1.2 | Comparative | 810 | 2 | 44.2 | 90.5 | One microporous membrane layer with ion exchange polymer embedded within and two ion exchange polymer layers | 4.6% | 6.3% | 35.1% | 1.3% |
| 1.3 | Comparative | 1100 | 2 | 27.9 | 58.4 | One microporous membrane layer with ion exchange polymer embedded within and two ion exchange polymer layers | 16.8% | 22.6% | 34.3% | 0.5% |
| 1.4 | Comparative | 900 | 3 | 22.7 | 47.1 | One microporous membrane layer with ion exchange polymer embedded within and two ion exchange polymer layers | 19.4% | 28.0% | 44.5% | 0.3% |
| 1.5 | Comparative | 900 | 4 | 17.9 | 36.7 | One microporous membrane layer with ion exchange polymer embedded within | 5.7% | 7.5% | 30.9% | 6.3% |

TABLE 2-continued

Summary of data for Comparative Examples 1.1-1.5

| Example # | Example Type | Ionomer EW g/mole eq. | ePTFE # | Thickness at 0% RH micron | Mass/area at 0% RH g/m$^2$ | Construction | Haze, Initial % | Haze, After blister test % | Haze change % | Blister area, After blister test % |
|---|---|---|---|---|---|---|---|---|---|---|
| | | | | | | and two ion exchange polymer layers | | | | |

2. Inventive Examples—A Composite Membrane with Continuous Ionomer Phase Manufactured with Single Pass Ionomer Coating in Accordance with Aspects of the Present Invention

Example 2.1

A 21.6 micron thick composite membrane comprising of ion exchange polymer perfluoro sulfonic acid resin with EW of 820 g/(mole acid equivalence) reinforced with expanded porous polytetrafluoroethylene membrane #3 was prepared using conventional laboratory technique. Initially, a of water-ethanol based solution of perfluoro sulfonic acid resin with EW=820 g/mole eq. (product IW100-800, obtained from Asahi Glass Company) was coated onto a moving carrier substrate using a slot die, and laminated with an ePTFE membrane #3 that was moving in the same direction. The carrier substrate is a polymer sheet (obtained from DAICEL VALUE COATING LTD., Japan) comprising PET and a protective layer of cyclic olefin copolymer (COC), and is oriented with the COC side on top. This laminate was subsequently dried in an oven at 160° C. and annealed at that temperature for 1 minute producing a solid coated structure comprising the carrier substrate coupled to an ion exchange polymer layer followed by microporous polytetrafluoroethylene membrane layer with the ion exchange polymer embedded within and had total thickness of 21.6 micron and mass/area of 44.9 g/m$^2$ at 0% RH. As can be seen from FIGS. 3E-3F, the resulting composite membrane was characterized by having ion exchange material that is embedded within the microporous polymer structure leaving a non-occlusive portion of the microporous polymer structure closest to the first surface and forming a layer on the second surface of the microporous polymer structure The resulting composite membrane was had haze value of 65%.

To determine characteristics such as susceptibility of the composite membrane to blistering in an all-liquid environment with variable ionic strength, a blister test procedure was performed as described earlier. The haze for the sample of composite membrane 1.5 with discontinuous ionomer phase after blister testing as described above decreased by −6.2% to the value of 61.0%. The bubble or blister area for sample of composite membrane 2.1 with continuous ionomer phase prepared as described above was about 0% measured as a ratio of the area of the ionomer to the area of the bubbles or blisters in the ionomer. FIG. 6A shows photographs of a 3 cm×3 cm and 1 cm×1 cm areal view of composite membrane 600 before blister test have been conducted and after the blister test been conducted, with the membrane after blister testing having an absence of bubbles or blisters.

Example 2.2

A 44.6 micron thick composite membrane comprised of ion exchange polymer perfluoro sulfonic acid resin with EW of 810 g/(mole acid equivalence) reinforced with one layer of expanded porous ePTFE membrane #1 was prepared using conventional laboratory technique. Initially, a of water-ethanol based solution of perfluoro sulfonic acid resin with EW=810 g/mole eq. (obtained from Shanghai Gore 3F Fluoromaterials Co., LTD., China) was coated onto carrier substrate restrained in a frame using a draw down bar, and laminated with an ePTFE membrane #1. The carrier substrate is a polymer sheet (obtained from DAICEL VALUE COATING LTD., Japan) comprising PET and a protective layer of cyclic olefin copolymer (COC), and is oriented with the COC side on top. This laminate was subsequently dried in an oven at 160° C. and annealed at that temperature for 1 minute producing a solid coated structure comprising the carrier substrate coupled to a polymer layer reinforced with expanded porous polytetrafluoroethylene. The resulting composite membrane comprised the carrier substrate coupled to an ion exchange polymer layer followed by microporous polytetrafluoroethylene membrane layer with the ion exchange polymer embedded within and had total thickness of 44.6 micron and mass/area of 91.8 g/m$^2$ at 0% RH. The resulting composite membrane was characterized by having ion exchange material that is embedded within the microporous polymer structure leaving a non-occlusive portion of the microporous polymer structure closest to the first surface and forming a layer on the second surface of the microporous polymer structure. The composite membrane had haze value of 24.4%.

To determine characteristics such as susceptibility of the composite membrane to blistering in an all-liquid environment with variable ionic strength, a blister test procedure was performed as described earlier with the composite membrane after blister testing having an absence of bubbles or blisters. The haze for the sample of composite membrane 2.2 with continuous ionomer phase after blister testing as described above decreased by −11.3% to the value of 21.6%. The bubble or blister area for the sample of composite membrane 2.2 with continuous ionomer phase prepared as described above was about 0% measured as a ratio of the area of the ionomer to the area of the bubbles or blisters in the ionomer.

Example 2.3

A 28.1 micron thick composite membrane comprised of ion exchange polymer perfluoro sulfonic acid resin with EW of 1100 g/(m ole acid equivalence) reinforced with one layer of expanded porous ePTFE membrane #1 was prepared using conventional laboratory technique. Initially, a of water-ethanol based solution of perfluoro sulfonic acid resin with EW=1100 g/mole eq. (D2021, obtained from Ion Power Inc., USA) was coated onto carrier substrate restrained in a frame using a draw down bar, and laminated with an ePTFE membrane #1. The carrier substrate is a polymer sheet (obtained from DAICEL VALUE COATING LTD., Japan) comprising PET and a protective layer of cyclic olefin copolymer (COC), and is oriented with the COC side on top. This laminate was subsequently dried in an oven at 160° C. and annealed at that temperature for 1 minute. The resulting composite membrane comprised the carrier substrate coupled to a microporous polytetrafluoroethylene membrane layer with the ion exchange polymer embedded within and had total thickness of 28.1 micron and mass/area of 59.5 g/m$^2$ at 0% RH. The resulting composite membrane was characterized by having ion exchange material that is embedded within the microporous polymer structure leaving a non-occlusive portion of the microporous polymer structure closest to the first surface and not having a layer on the second surface of the microporous polymer structure. The composite membrane had haze value of 27.8%.

To determine characteristics such as susceptibility of the composite membrane to blistering in an all-liquid environment with variable ionic strength, a blister test procedure was performed as described earlier with the composite membrane after blister testing having an absence of bubbles or blisters. The haze for the sample of composite membrane 2.3 with continuous ionomer phase after blister testing as described above decreased by −5.9% to the value of 26.2%. The bubble or blister area for the sample of composite membrane 2.3 with continuous ionomer phase prepared as described above was about 0% measured as a ratio of the area of the ionomer to the area of the bubbles or blisters in the ionomer.

Example 2.4

A 23.2 micron thick composite membrane comprised of ion exchange polymer perfluoro sulfonic acid resin with EW of 900 g/(mole acid equivalence) reinforced with one layer of expanded porous ePTFE membrane #2 was prepared using conventional laboratory technique. Initially, a of water-ethanol based solution of perfluoro sulfonic acid resin with EW=900 g/mole eq. (obtained from Shanghai Gore 3F Fluoromaterials Co., LTD., China) was coated onto carrier substrate restrained in a frame using a draw down bar, and laminated with an ePTFE membrane #2. The carrier substrate is a polymer sheet (obtained from DAICEL VALUE COATING LTD., Japan) comprising PET and a protective layer of cyclic olefin copolymer (COC), and is oriented with the COC side on top. This laminate was subsequently dried in an oven at 160° C. and annealed at that temperature for 1 minute. The resulting composite membrane comprised the carrier substrate coupled to a microporous polytetrafluoroethylene membrane layer with the ion exchange polymer embedded within and had total thickness of 23.2 micron and mass/area of 49.2 g/m$^2$ at 0% RH. The resulting composite membrane was characterized by having ion exchange material that is embedded within the microporous polymer structure leaving a non-occlusive portion of the microporous polymer structure closest to the first surface and not having a layer on the second surface of the microporous polymer structure. The composite membrane had haze value of 35.2%.

To determine characteristics such as susceptibility of the composite membrane to blistering in an all-liquid environment with variable ionic strength, a blister test procedure was performed as described earlier with the composite membrane after blister testing having an absence of bubbles or blisters. The haze for the sample of composite membrane 2.4 with continuous ionomer phase after blister testing as described above decreased by −20.7% to the value of 27.9%. The bubble or blister area for the sample of composite membrane 2.4 with continuous ionomer phase prepared as described above was about 0% measured as a ratio of the area of the ionomer to the area of the bubbles or blisters in the ionomer.

Example 2.5

A 18.4 micron thick composite membrane comprised of ion exchange polymer perfluoro sulfonic acid resin with EW of 900 g/(mole acid equivalence) reinforced with one layer of expanded porous ePTFE membrane #3 was prepared using conventional laboratory technique. Initially, a of water-ethanol based solution of perfluoro sulfonic acid resin with EW=900 g/mole eq. (obtained from Shanghai Gore 3F Fluoromaterials Co., LTD., China) was coated onto carrier substrate restrained in a frame using a draw down bar, and laminated with an ePTFE membrane #3. The carrier substrate is a polymer sheet (obtained from DAICEL VALUE COATING LTD., Japan) comprising PET and a protective layer of cyclic olefin copolymer (COC), and is oriented with the COC side on top. This laminate was subsequently dried in an oven at 160° C. and annealed at that temperature for 1 minute. The resulting composite membrane comprised the carrier substrate coupled to a polymer layer reinforced with expanded porous polytetrafluoroethylene and had total thickness of 18.4 micron and mass/area of 38.6 g/m$^2$ at 0% RH. The resulting composite membrane was characterized by having ion exchange material that is embedded within the microporous polymer structure leaving a non-occlusive portion of the microporous polymer structure closest to the first surface and having a layer on the second surface of the microporous polymer structure. The composite membrane had haze value of 77.3%.

To determine characteristics such as susceptibility of the composite membrane to blistering in an all-liquid environment with variable ionic strength, a blister test procedure was performed as described earlier with the composite membrane after blister testing having an absence of bubbles or blisters. The haze for the sample of composite membrane 2.5 with continuous ionomer phase after blister testing as described above decreased by −8.7% to the value of 60.5%. The bubble or blister area for the sample of composite membrane 2.5 with continuous ionomer phase prepared as described above was about 0% measured as a ratio of the area of the ionomer to the area of the bubbles or blisters in the ionomer.

The data for inventive examples 2.1-2.5 is summarized in Table 3.

TABLE 3

Summary of data for inventive examples 2.1-2.5

| | | | | | | | | Composite membrane | | | |
|---|---|---|---|---|---|---|---|---|---|---|---|
| Example # | Example Type | Ionomer EW g/mole eq. | ePTFE # | Thickness at 0% RH micron | Mass/area at 0% RH g/m² | Construction | Haze, Initial | Haze, After blister test % | Haze change % | Blister area, After blister test % |
| 2.1 | Inventive | 820 | 3 | 21.6 | 44.9 | One microporous membrane layer with ion exchange polymer embedded within and one ion exchange polymer layers | 65.0% | 61.0% | −6.2% | 0.0% |
| 2.2 | Inventive | 810 | 1 | 44.6 | 91.8 | One microporous membrane layer with ion exchange polymer embedded within and one ion exchange polymer layers | 24.4% | 21.6% | −11.3% | 0.0% |
| 2.3 | Inventive | 1100 | 1 | 28.1 | 59.5 | One microporous membrane layer with ion exchange polymer embedded within | 27.8% | 26.2% | −5.9% | 0.0% |
| 2.4 | Inventive | 900 | 2 | 23.2 | 49.2 | One microporous membrane layer with ion exchange polymer embedded within | 35.2% | 27.9% | −20.7% | 0.0% |
| 2.5 | Inventive | 900 | 3 | 18.4 | 38.6 | One microporous membrane layer with ion exchange polymer embedded within and one ion exchange polymer layers | 77.3% | 60.5% | −8.7% | 0.0% |

While the invention has been described in detail, modifications within the spirit and scope of the invention will be readily apparent to the skilled artisan. It should be understood that aspects of the invention and portions of various embodiments and various features recited above and/or in the appended claims may be combined or interchanged either in whole or in part. In the foregoing descriptions of the various embodiments, those embodiments which refer to another embodiment may be appropriately combined with other embodiments as will be appreciated by the skilled artisan. Furthermore, the skilled artisan will appreciate that the foregoing description is by way of example only, and is not intended to limit the invention.

We claim:

1. A method of forming the composite membrane, the method comprising:
    (a) providing a support layer,
    (b) applying an ion exchange material to the support layer in one step,
    (c) obtaining a microporous polymer structure comprising at least one microporous polymer layer;
    (d) laminating the at least one microporous polymer layer to the ion exchange material to form an impregnated microporous polymer structure having a continuous ionomer phase,
    (e) applying an ion exchange material on a top surface of the impregnated microporous polymer structure according to method step (d), (f) drying the impregnated microporous polymer structure to form the composite membrane having a continuous ionomer phase, and (g) annealing thermally the composite membrane, to provide a composite membrane comprising:

a microporous polymer structure; and an ion exchange material at least partially embedded within the microporous polymer structure and rendering at least a portion of the microporous polymer structure occlusive, wherein the ion exchange material forms a continuous ionomer phase within the composite membrane, wherein the composite membrane includes multiple layers of the ion exchange material provided on top of one another which do not have any internal interface between the layers, and wherein the composite membrane has a haze which is the ratio of diffuse transmittance to total transmittance of light through the composite membrane and the composite membrane exhibits a change of the haze of 0% or less after being subjected to a blister test procedure.

2. The method according to claim 1, wherein no internal interface is present between applications of the ion exchange material, the microporous polymer structure, or any combination thereof.

3. The method according to claim 1, wherein the drying and annealing thermally of the composite membrane is conducted at a temperature from 160 to 220° C.

4. The method according to claim 1, wherein the ion exchange material is applied in steps (b) and (e) without an intervening drying step.

5. The method according to claim 1, wherein the composite membrane comprises a bottom surface and an opposing top surface, the composite membrane further comprising:

an additional layer of ion exchange material is provided at the bottom surface of the composite membrane.

6. The method according to claim 1, wherein the blister test procedure includes:

at step one, immersing the composite membrane for 3 minutes in a 6 mol/L aqueous sulfuric acid solution at 80° C., at step two, removing the composite membrane from the aqueous sulfuric acid solution, at step three, immersing the composite membrane for 1 minute in deionized water at ambient conditions, at step four, removing the composite membrane from the deionized water, repeating cycle composed of steps one through four at least two times, at step five, drying the composite membrane at ambient conditions, and at step six, counting bubbles or blisters formed on the composite membrane.

7. The method according to claim 1, wherein a haze value of the composite membrane prior to the blister test procedure is between 5% and 95%.

8. The method according to claim 1, wherein the bubble or blister area of a composite membrane with a continuous ionomer phase after exposure to the blister test procedure is less than 0.3%.

9. The method according to claim 1, wherein the microporous polymer structure comprises expanded polytetrafluoroethylene.

10. The method according to claim 1, wherein the microporous polymer structure comprises a hydrocarbon polyolefin.

11. The method according to claim 10, wherein the hydrocarbon polyolefin comprises polyethylene, polypropylene, or polystyrene.

12. The method according to claim 1, wherein the ion exchange material comprises at least one ionomer.

13. The method according to claim 1, wherein the at least one ionomer comprises a proton conducting polymer.

14. The method according to claim 13, wherein the proton conducting polymer comprises perfluorosulfonic acid.

* * * * *